(12) United States Patent
Priewasser et al.

(10) Patent No.: US 12,472,581 B2
(45) Date of Patent: Nov. 18, 2025

(54) METHOD OF PROCESSING A SUBSTRATE AND SYSTEM FOR PROCESSING A SUBSTRATE

(71) Applicant: DISCO CORPORATION, Tokyo (JP)

(72) Inventors: Karl Heinz Priewasser, Munich (DE); Naoko Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 774 days.

(21) Appl. No.: 17/658,926

(22) Filed: Apr. 12, 2022

(65) Prior Publication Data

US 2022/0331899 A1 Oct. 20, 2022

(30) Foreign Application Priority Data

Apr. 20, 2021 (DE) ..................... 10 2021 203 911.1

(51) Int. Cl.
*B23K 26/03* (2006.01)
*B23K 26/00* (2014.01)
(Continued)

(52) U.S. Cl.
CPC .......... *B23K 26/032* (2013.01); *B23K 26/009* (2013.01); *B23K 26/38* (2013.01); *B23K 2101/40* (2018.08)

(58) Field of Classification Search
CPC ............... A61K 31/135; A61K 31/713; B23K 2101/40; B23K 26/009; B23K 26/032; B23K 26/0624; B23K 26/38; B23K 26/53; B23K 26/00; B23K 26/03; B23K 2103/172; B23K 2103/50; B23K 26/0622; B23K 26/08; B23K 26/16; B23K 26/361; B23K 26/40; C12Q 1/6886; C12Q 2600/112; C12Q 2600/158; G01N 33/57407; G01N 33/57488; G01N 33/574; B32B 17/10036; B32B 17/10761; H02S 20/26; H10F 10/167; H10F 19/30; H10F 19/31;
(Continued)

(56) References Cited

U.S. PATENT DOCUMENTS 8,772,078 B1 * 7/2014 Farris, III ............ B23K 26/361
438/30
2012/0071056 A1 * 3/2012 Oka ....................... B23K 26/361
445/2
(Continued)

FOREIGN PATENT DOCUMENTS

CN 107301960 A 10/2017
DE 102012109354 A1 4/2013
(Continued)

*Primary Examiner* — Elizabeth M Kerr
*Assistant Examiner* — Adam M Eckardt
(74) *Attorney, Agent, or Firm* — Greer Burns & Crain Ltd.

(57) ABSTRACT

A substrate having a first side and a second side opposite to the first side is processed by attaching a protective film to the first side and, after attachment, processing the substrate from the second side of the substrate. After processing from the second side, the second side is inspected for defects on the second side of the substrate. After inspection for defects, a support film is attached to the second side of the substrate. The protective film is removed from the first side of the substrate and, after removing the protective film, the first side of the substrate is inspected for defects on the first side of the substrate.

20 Claims, 6 Drawing Sheets

(51) Int. Cl.
*B23K 26/38* (2014.01)
*B23K 101/40* (2006.01)

(58) Field of Classification Search
CPC ........ H10F 19/80; H10F 19/807; H10F 71/00; H10F 77/00; H10F 77/45; H01L 21/00
See application file for complete search history.

(56) References Cited

U.S. PATENT DOCUMENTS

| | | |
|---|---|---|
| 2013/0299098 A1 | 11/2013 | Maki et al. |
| 2017/0005016 A1* | 1/2017 | Yamamoto ............. B32B 27/38 |
| 2018/0315610 A1 | 11/2018 | Sekiya et al. |
| 2020/0266103 A1 | 8/2020 | Sekiya |

FOREIGN PATENT DOCUMENTS

| | | |
|---|---|---|
| JP | 2002043251 A | 2/2002 |
| JP | 2019212797 A | 12/2019 |
| JP | 2021034414 A | 3/2021 |
| KR | 1020210015716 A | 2/2021 |
| TW | 202013475 A | 4/2020 |

* cited by examiner

METHOD OF PROCESSING A SUBSTRATE AND SYSTEM FOR PROCESSING A SUBSTRATE

TECHNICAL FIELD

The present invention relates to a method of processing a substrate, such as a wafer, having a first side and a second side being opposite to the first side. Further, the present invention relates to a system for performing this method.

TECHNICAL BACKGROUND

The processing of a substrate, such as a wafer, often has to be performed with a high degree of accuracy, efficiency and reliability. For example, in a device fabrication process, e.g., for producing semiconductor devices, a substrate, such as a wafer, having a device area with a plurality of devices, commonly partitioned by a plurality of division lines, is divided into individual chips or dies. This fabrication process generally comprises a grinding step for adjusting the substrate thickness and a cutting step of cutting the substrate along the division lines to obtain the individual chips or dies. The grinding step is performed from a back side of the substrate which is opposite to a substrate front side on which the device area is formed. Moreover, also other processing steps, such as polishing and/or etching, may be carried out on the back side of the substrate. The substrate may be cut along the division lines from its front side or its back side. In order to ensure a high quality of the resulting chips or dies, the processing steps have to be carried out in a precise and reliable manner.

When processing a substrate, for example, during dividing, e.g., cutting, the substrate, defects can occur which may affect the quality of the divided substrate, in particular, for the case of dividing the substrate into chips or dies. Such possible defects may include front side chipping, back side chipping, delamination of layers formed on or in the substrate material, cracks, non-straight cut lines (meandering), burrs, whiskers, particles, contaminations, die shifts, die size differences and non-separated dies (i.e., dies which have not been fully separated from each other). This problem is particularly pronounced for the case of high-end devices which need to meet critical quality standards.

In order to address the above-identified issue, in some conventional processing methods, the substrate is inspected for defects after processing. Such defect inspection, e.g., detecting whether the size of chipping is within an acceptable range, may be performed outside or inside the used processing equipment. For example, a camera installed in the processing equipment can be used for this purpose.

However, the conventional approach only allows for defects on one side of the substrate to be identified. In particular, if a front side of the substrate is exposed, only front side inspection is possible while, if a back side of the substrate is exposed, only back side inspection is possible. Hence, there is a problem that defects may not be detected with a high degree of accuracy and reliability, which is particularly important, for example, for the case of high-end devices. Also, it can be difficult to trace where and when the defects occurred during processing.

Thus, there remains a need for an efficient method of processing a substrate and an efficient substrate processing system which allow for defects in the substrate to be accurately and reliably identified.

SUMMARY OF THE INVENTION

Accordingly, it is an object of the present invention to provide an efficient method of processing a substrate which allows for defects in the substrate to be accurately and reliably identified. Further, the invention aims to offer a substrate processing system for performing this method. These goals are achieved by a substrate processing method with the technical features of claim 1 and by a substrate processing system with the technical features of claim 16. Preferred embodiments of the invention follow from the dependent claims.

The invention provides a method of processing a substrate, the substrate having a first side or surface and a second side or surface being opposite to the first side or surface. The method comprises attaching a protective film to the first side of the substrate, after attaching the protective film to the first side of the substrate, processing the substrate from the second side of the substrate and, after processing the substrate from the second side of the substrate, inspecting the second side of the substrate for defects from the second side of the substrate. Further, the method comprises, after inspecting the second side of the substrate for defects, attaching a support film to the second side of the substrate, removing the protective film from the first side of the substrate and, after removing the protective film from the first side of the substrate, inspecting the first side of the substrate for defects from the first side of the substrate.

In the method of the invention, the substrate is inspected for defects from both sides, i.e., from its first side and from its second side, after processing. Hence, any defects in the substrate caused by processing can be accurately and reliably identified. Further, since defect information is obtained for both sides of the substrate, the nature of any defect or defects identified can be determined more precisely. This also enhances the traceability of the defects, enabling a more accurate and reliable assessment of where and when the defects occurred during processing.

The first side of the substrate is inspected for defects from the first side of the substrate after the protective film has been removed from the first side of the substrate. In this way, the accuracy, reliability and efficiency of the defect inspection are further enhanced. In particular, when removing the protective film from the first side of the substrate, any particulates, such as chippings or debris, which have been separated from the substrate during processing but remain on the substrate due to the presence of the protective film, can also be removed. This allows for the detection of defects in the substrate which may not be identifiable prior to removing the protective film.

Therefore, the present invention provides an efficient method of processing a substrate which allows for defects in the substrate to be accurately and reliably identified.

The first side of the substrate may be a front side or a back side of the substrate. The second side of the substrate may be a front side or a back side of the substrate.

The first side or surface of the substrate and the second side or surface of the substrate may be substantially parallel to each other.

Possible defects to be identified when inspecting the first and second sides of the substrate include, for example, front side chipping, back side chipping, delamination of layers formed on or in the substrate material, cracks, non-straight cut lines (meandering), burrs, whiskers, particles, contaminations, die shifts, die size differences and non-separated dies (i.e., dies or chips which have not been fully separated from each other).

The substrate may be, for example, made of a semiconductor, glass, sapphire ($Al_2O_3$), a ceramic, such as an alumina ceramic, quartz, zirconia, PZT (lead zirconate titanate), a polycarbonate, an optical crystal material or the like.

In particular, the substrate may be, for example, made of silicon carbide (SiC), silicon (Si), gallium arsenide (GaAs), gallium nitride (GaN), gallium phosphide (GaP), indium arsenide (InAs), indium phosphide (InP), silicon nitride (SiN), lithium tantalate (LT), lithium niobate (LN), aluminium nitride (AlN), silicon oxide ($SiO_2$) or the like.

The substrate may be a single crystal substrate, a glass substrate, a compound substrate, such as a compound semiconductor substrate, e.g., a SiC, SiN, GaN or GaAs substrate, or a polycrystalline substrate, such as a ceramic substrate.

The substrate may be a wafer. For example, the substrate may be a semiconductor-sized wafer. Herein, the term "semiconductor-sized wafer" refers to a wafer with the dimensions (standardised dimensions), in particular, the diameter (standardised diameter), i.e., outer diameter, of a semiconductor wafer. The dimensions, in particular, the diameters, i.e., outer diameters, of semiconductor wafers are defined in the SEMI standards. For example, the dimensions of polished single crystal silicon (Si) wafers are defined in the SEMI standards M1 and M76. The semiconductor-sized wafer may be a 3 inch, 4 inch, 5 inch, 6 inch, 8 inch, 12 inch or 18 inch wafer.

The substrate may be a semiconductor wafer. For example, the substrate may be made of any of the semiconductor materials given above.

The substrate, such as a wafer, may be made of a single material or of a combination of different materials, e.g., two or more of the above-identified materials. For example, the substrate may be a Si and glass bonded wafer in which a wafer element made of Si is bonded to a wafer element made of glass.

A metal layer or metal coating may be present on the first side or the second side of the substrate, in particular, on the entire first side or the entire second side of the substrate. A metal layer or metal coating may be present on a back side of the substrate, in particular, on the entire back side of the substrate.

The substrate may have any type of shape. In a top view thereon, the substrate may have, for example, a circular shape, an oval shape, an elliptical shape or a polygonal shape, such as a rectangular shape or a square shape.

The method of the invention may further comprise inspecting the first side of the substrate for defects through the protective film before removing the protective film from the first side of the substrate. In this case, the method comprises two steps of inspecting the first side of the substrate for defects from the first side of the substrate, one before and one after removing the protective film from the first side of the substrate. Hence, the accuracy and reliability of the defect detection can be further enhanced. In particular, the combination of these two inspection steps allows for the nature of any defect or defects identified to be determined even more precisely.

Inspecting the first side of the substrate for defects through the protective film before removing the protective film from the first side of the substrate further enables inspection of the first substrate side directly after processing the substrate from the second side of the substrate. Hence, the position of the substrate, in particular, the positions of separate elements obtained by dividing the substrate, is precisely maintained. For instance, no possible shift or movement of the substrate or the separate elements obtained by dividing the substrate may have occurred by removing the protective film from the first side of the substrate, since this protective film removing step is performed at a later stage of the method. Further, the influence of any change in the properties of the protective film, such as a shrinkage or loosening of the protective film, in subsequent processing and/or handling steps on the inspection process can be minimised or even eliminated. Also, the step or steps of obtaining and/or correlating positional information, which will be described in detail below, can be carried out in a particularly accurate and reliable manner.

Moreover, by inspecting the first side of the substrate for defects through the protective film before removing the protective film from the first side of the substrate, the first substrate side can be inspected in a particularly safe and reliable manner. In particular, during this inspection process, the first side of the substrate is securely protected from contamination, such as dust or debris, by the protective film.

For example, the first side of the substrate may be inspected for defects through the protective film by radiation, such as visible light, which is transmitted through the protective film, i.e., for which the protective film is transparent. For example, a camera may be used for this purpose.

Inspecting the first side of the substrate for defects through the protective film may be performed before attaching the support film to the second side of the substrate. Inspecting the first side of the substrate for defects through the protective film may be performed after attaching the support film to the second side of the substrate.

The substrate may have, on the first side, a device area with a plurality of devices. The first side of the substrate may be the front side of the substrate.

The devices in the device area may be, for example, semiconductor devices, power devices, optical devices, medical devices, electrical components, MEMS devices or combinations thereof. The devices may comprise or be, for example, transistors, such as MOSFETs or insulated-gate bipolar transistors (IGBTs), or diodes, e.g., Schottky barrier diodes.

The substrate may further have, e.g., on the first side, a peripheral marginal area having no devices and being formed around the device area.

The substrate may have, on the second side, a patterned area, e.g., including devices, such as those described above, and/or electrical interconnections, for example, if the substrate is a through silicon via (TSV) wafer. The second side of the substrate may be the back side of the substrate.

The method may further comprise, if a defect or defects is or are identified by inspecting the second side of the substrate for defects from the second side of the substrate, determining a position or positions of the identified defect or defects, thereby obtaining first positional information. The first positional information is information specifying the position of each defect on the second side of the substrate. The position of each defect may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each defect may be defined in relation to an element, such as a centre, or elements of a supporting means supporting the substrate, e.g., a chuck table, and/or in relation to a seal ring or seal rings and/or in relation to a guard ring or guard rings.

When inspecting the second side of the substrate for defects from the second side of the substrate, the following information may be obtained: a distance or distances of the defect or defects from an element or elements of the substrate, such as a fiducial mark of the substrate, an alignment mark of the substrate, an edge of the substrate, a notch of the substrate, such as a wafer notch, an orientation flat of the substrate and/or a centre of the substrate; and/or a distance or distances of the defect or defects from an element, such as a centre, or elements of a supporting means supporting the substrate, e.g., a chuck table; and/or a size or sizes of the defect or defects; and/or a distance or distances of the defect or defects from a seal ring or seal rings; and/or a distance or distances of the defect or defects from a guard ring or guard rings. This information can be used for or as the first positional information.

The method may further comprise, if a defect or defects is or are identified by inspecting the first side of the substrate for defects from the first side of the substrate, after removing the protective film from the first side of the substrate, determining a position or positions of the identified defect or defects, thereby obtaining second positional information. The second positional information is information specifying the position of each defect on the first side of the substrate. The position of each defect may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each defect may be defined in relation to an element, such as a centre, or elements of a supporting means supporting the substrate, e.g., a chuck table, and/or in relation to a seal ring or seal rings and/or in relation to a guard ring or guard rings.

When inspecting the first side of the substrate for defects from the first side of the substrate, after removing the protective film from the first side of the substrate, the following information may be obtained: a distance or distances of the defect or defects from an element or elements of the substrate, such as a fiducial mark of the substrate, an alignment mark of the substrate, an edge of the substrate, a notch of the substrate, such as a wafer notch, an orientation flat of the substrate and/or a centre of the substrate; and/or a distance or distances of the defect or defects from an element, such as a centre, or elements of a supporting means supporting the substrate, e.g., a chuck table; and/or a size or sizes of the defect or defects; and/or a distance or distances of the defect or defects from a seal ring or seal rings; and/or a distance or distances of the defect or defects from a guard ring or guard rings. This information can be used for or as the second positional information.

The first and/or second positional information allows for a particularly good traceability of defects, enabling an even more accurate and reliable assessment of where and when the defects occurred during processing. For example, the first and/or second positional information can be used, e.g., in further processing, handling and/or transporting steps. In particular, if the substrate is divided into a plurality of separate elements, such as chips or dies, in the step of processing the substrate from the second side of the substrate or in a subsequent step, it can be ensured, by relying on the first and/or second positional information, in particular, by relying on the first and second positional information, that defective elements, e.g., defective chips or dies, are reliably separated out. Since the position of each defect on the second and first sides of the substrate is specified in the first and second positional information, respectively, such defective elements, e.g., defective chips or dies, can be identified and traced in a particularly accurate and efficient manner. The first and/or second positional information can be correlated with information on the position of particular portions or regions of the substrate, for example, portions or regions in which devices, electrical interconnections or the like are formed. In particular, the first and/or second positional information can be correlated with information on the position of each element to be obtained by dividing the substrate in the substrate. In this way, defective elements can be especially reliably identified and traced. The position of each particular portion or region of the substrate, in particular, the position of each element to be obtained by dividing the substrate in the substrate, may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each particular portion or region of the substrate, in particular, the position of each element to be obtained by dividing the substrate, may be defined in relation to an element, such as a centre, or elements of a supporting means supporting the substrate, e.g., a chuck table, and/or in relation to a seal ring or seal rings and/or in relation to a guard ring or guard rings.

Defective elements thus can be identified and traced by inspecting the substrate rather than individually inspecting each element, so that the efficiency of the method is further enhanced.

Determining the position of each defect on the first and second sides of the substrate and using the first and/or second positional information in subsequent processing, handling and/or transporting steps can be performed by data processing equipment, e.g., using software, a data communication set-up and/or a control function configured for this purpose. In particular, such equipment may be used for identifying and/or tracing defective elements, such as defective chips or dies.

If the method comprises a step of inspecting the first side of the substrate for defects through the protective film before removing the protective film from the first side of the substrate, the method may further comprise, if a defect or defects is or are identified by inspecting the first side of the substrate for defects through the protective film, determining a position or positions of the identified defect or defects, thereby obtaining third positional information. The third positional information is information specifying the position of each defect on the first side of the substrate. The position of each defect may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each defect may be defined in relation to an element, such as a centre, or elements of a supporting means supporting the substrate, e.g., a chuck table, and/or in relation to a seal ring or seal rings and/or in relation to a guard ring or guard rings.

When inspecting the first side of the substrate for defects through the protective film before removing the protective film from the first side of the substrate, the following information may be obtained: a distance or distances of the defect or defects from an element or elements of the substrate, such as a fiducial mark of the substrate, an alignment mark of the substrate, an edge of the substrate, a notch of the substrate, such as a wafer notch, an orientation flat of the substrate and/or a centre of the substrate; and/or a distance or distances of the defect or defects from an element, such as a centre, or elements of a supporting means supporting the substrate, e.g., a chuck table; and/or a size or sizes of the defect or defects; and/or a distance or distances of the defect or defects from a seal ring or seal rings; and/or a distance or distances of the defect or defects from a guard ring or guard rings. This information can be used for or as the third positional information.

For instance, a comparison between the second and third positional information allows for the nature of any defect or defects identified to be determined even more precisely.

Further, the third positional information can be used, e.g., in further processing, handling and/or transporting steps, in particular, for identifying and tracing defective elements.

The method may further comprise correlating the first positional information with the second positional information.

By correlating the first positional information with the second positional information, the nature of any defect or defects identified can be determined with an even higher degree of precision. Also, the efficiency and reliability of identifying and tracing defective portions, in particular, defective elements, of the substrate can be further enhanced. For example, the first and second positional information may be correlated with each other and with information on the position of each portion of the substrate, e.g., each element to be obtained by dividing the substrate, in the substrate.

The method may comprise correlating the first positional information with the second positional information and/or with the third positional information.

Correlating the first positional information with the second positional information and/or with the third positional information can be performed by data processing equipment, such as that described above.

In the method of the invention, inspecting the second side of the substrate for defects from the second side of the substrate may be performed using an inspection means. The inspection means may be also used for inspecting the first side of the substrate for defects from the first side of the substrate. In this case, a single inspection means is used for inspecting the first and second sides of the substrate. In this way, the method can be performed in a particularly simple and cost-efficient manner.

The inspection means may be also used for inspecting the first side of the substrate for defects through the protective film. In this case, a single inspection means is used for all three inspection steps, rendering the method even more simple and efficient.

The inspection means may be arranged on or in a processing equipment or processing means used for processing the substrate from the second side of the substrate. The inspection means may form part of such a processing equipment or processing means. In this case, the method can be performed in a particularly efficient manner.

Alternatively, the inspection means may be arranged outside the processing equipment or processing means. For example, the inspection means may be arranged in a separate inspection equipment, such as an optical inspection equipment.

The inspection means may be, for example, a camera, such as a microscope camera for optical inspection.

Alternatively, a first inspection means may be used for inspecting the second side of the substrate for defects from the second side of the substrate and a different second inspection means may be used for inspecting the first side of the substrate for defects from the first side of the substrate. The second inspection means or a different third inspection means may be used for inspecting the first side of the substrate for defects through the protective film.

One, two or all of the first to third inspection means may be arranged on or in the processing equipment or processing means used for processing the substrate from the second side of the substrate. One, two or all of the first to third inspection means may form part of such a processing equipment or processing means.

One, two or all of the first to third inspection means may be arranged outside the processing equipment or processing means. For example, one, two or all of the first to third inspection means may be arranged in a separate inspection equipment, such as an optical inspection equipment. All of the first to third inspection means may be arranged in the same separate inspection equipment. Each of the first to third inspection means may be arranged in a different separate inspection equipment.

The first inspection means may be, for example, a camera, such as a microscope camera for optical inspection. The second inspection means may be, for example, a camera, such as a microscope camera for optical inspection. The third inspection means may be, for example, a camera, such as a microscope camera for optical inspection.

The support film may be made of a single material, in particular, a single homogeneous material. The support film may be, for example, a sheet or a foil.

The support film may be made of a plastic material, such as a polymer. For example, the support film may be made of a polyolefin, such as polyethylene (PE), polypropylene (PP) or polybutylene (PB).

The support film may have a thickness in the range of 5 to 500 µm, preferably 5 to 200 µm, more preferably 8 to 100 µm, even more preferably 10 to 80 µm and yet even more preferably 12 to 50 µm. Particularly preferably, the support film has a thickness in the range of 80 to 250 µm.

The support film may have any type of shape. In a top view thereon, the support film may have, for example, a circular shape, an oval shape, an elliptical shape or a polygonal shape, such as a rectangular shape or a square shape.

The support film may be attached to the second side of the substrate with an adhesive. The adhesive may be present on an entire front surface of the support film which comes into contact with the second side of the substrate. For example, the support film may be a UV curable adhesive tape.

Alternatively, the support film may be attached to the second side of the substrate so that at least a central area of the front surface of the support film is in direct contact with the second side of the substrate, such that no adhesive is present between at least the central area of the front surface of the support film and the second side of the substrate.

By attaching the support film to the second side of the substrate so that at least the central area of the front surface of the support film is in direct contact with the second side of the substrate, the risk of a possible contamination of or damage to the substrate, e.g., due to an adhesive force of an adhesive layer or adhesive residues on the substrate, can be significantly reduced or even eliminated.

The support film may be attached to the second side of the substrate so that, in the entire region where the front surface of the support film is in contact with the second side of the substrate, the front surface of the support film is in direct contact with the second side of the substrate. Thus, no material, in particular, no adhesive, is present between the front surface of the support film and the second side of the substrate.

In this way, the risk of a possible contamination of or damage to the substrate, e.g., due to an adhesive force of an adhesive layer or adhesive residues on the substrate, can be reliably eliminated.

The entire front surface of the support film may be free of adhesive.

An adhesive, e.g., an adhesive layer, may be provided only in a peripheral area of the front surface of the support film. The peripheral area of the front surface of the support film may be arranged so as to surround the central area of the front surface of the support film.

The front surface of the support film may be attached to the second side of the substrate so that the adhesive layer comes into contact only with a peripheral portion of the second side of the substrate. The peripheral portion of the second side of the substrate may be or correspond to a peripheral marginal area of the substrate.

By using such an adhesive layer, the attachment of the support film to the substrate can be further improved. Moreover, since the adhesive layer is provided only in the peripheral area of the front surface of the support film, the area in which support film and substrate are attached to each other by the adhesive layer is significantly reduced as compared to a case where an adhesive layer is provided on the entire front surface of the support film. Thus, the support film can be detached from the substrate more easily and the risk of damage to the substrate is considerably reduced.

Attaching the support film to the second side of the substrate may consist of or comprise applying an external stimulus to the support film. By applying the external stimulus, an attachment force between support film and substrate, holding the support film in its position on the substrate, is generated. Hence, no additional adhesive material is necessary for attaching the support film to the second side of the substrate.

In particular, by applying the external stimulus to the support film, a form fit, such as a positive fit, and/or a material bond, such as an adhesive bond, may be formed between the support film and the substrate. The terms "material bond" and "adhesive bond" define an attachment or connection between support film and substrate due to atomic and/or molecular forces acting between these two components.

The term "adhesive bond" relates to the presence of these atomic and/or molecular forces, which act so as to attach or adhere the support film to the substrate, and does not imply the presence of an additional adhesive between support film and substrate. Rather, in the embodiment detailed above, at least the central area of the front surface of the support film is in direct contact with the second side of the substrate.

Applying the external stimulus to the support film may comprise or consist of heating the support film and/or cooling the support film and/or applying a vacuum to the support film and/or irradiating the support film with radiation, such as light, e.g., by using a laser beam.

The external stimulus may comprise or be a chemical compound and/or electron or plasma irradiation and/or a mechanical treatment, such as pressure, friction or ultrasound application, and/or static electricity.

A cushioning layer may be attached to a back surface of the support film opposite to the front surface thereof. A front surface of the cushioning layer may be attached to the back surface of the support film.

This approach is particularly advantageous, if protrusions, projections, recesses and/or trenches, such as surface unevenness or roughness, bumps, optical elements, e.g., optical lenses, other structures or the like, protrude, extend or project along the thickness direction of the substrate from the second side of the substrate. In this case, the protrusions or projections define a surface structure or topography of the respective substrate side, rendering this side uneven. If the cushioning layer is attached to the back surface of the support film, such protrusions and/or recesses can be embedded in the cushioning layer. By embedding the protrusions in the cushioning layer, the protrusions, such as for example optical elements or other structures, are reliably protected from any damage.

The material of the cushioning layer is not particularly limited. In particular, the cushioning layer may be formed of any type of material which allows for protrusions protruding along the thickness direction of the substrate to be embedded therein. For example, the cushioning layer may be formed of a resin, an adhesive, a gel or the like.

The cushioning layer may be curable by an external stimulus, such as UV radiation, heat, an electric field and/or a chemical agent. In this case, the cushioning layer hardens at least to some degree upon application of the external stimulus thereto. For example, the cushioning layer may be formed of a curable resin, a curable adhesive, a curable gel or the like.

The cushioning layer may be configured so as to exhibit a degree of compressibility, elasticity and/or flexibility after curing thereof, i.e., to be compressible, elastic and/or flexible after curing. For example, the cushioning layer may be such that it is brought into a rubber-like state by curing. Alternatively, the cushioning layer may be configured so as to reach a rigid, hard state after curing.

Preferred examples of UV curable resins for use as the cushioning layer in the methods of the invention are ResiFlat by the DISCO Corporation and TEMPLOC by DENKA.

The method may further comprise applying the external stimulus to the cushioning layer so as to cure the cushioning layer.

The cushioning layer may have a thickness in the range of 10 to 300 μm, preferably 20 to 250 μm and more preferably 50 to 200 μm.

A base sheet may be attached to a back surface of the cushioning layer opposite to the front surface thereof which is attached to the support film.

The material of the base sheet is not particularly limited. The base sheet may be made of a soft or pliable material, such as, for example, a polymer material, e.g., polyvinyl chloride (PVC), ethylene vinyl acetate (EVA) or a polyolefin.

Alternatively, the base sheet may be made of a rigid or hard material, such as polyethylene terephthalate (PET) and/or silicon and/or glass and/or stainless steel (SUS).

For example, if the base sheet is made of polyethylene terephthalate (PET) or glass and the cushioning layer is curable by an external stimulus, the cushioning layer may be cured with radiation that is transmittable through polyethylene terephthalate (PET) or glass, for instance UV radiation. If the base sheet is made of silicon or stainless steel (SUS), a cost-efficient base sheet is provided.

Also, the base sheet may be formed of a combination of the materials listed above.

The base sheet may have a thickness in the range of 30 to 1500 μm, preferably 40 to 1200 μm and more preferably 50 to 1000 μm.

The protective film is configured to protect the first side of the substrate, in particular, during processing the substrate from the second side of the substrate.

The protective film may be made of a single material, in particular, a single homogeneous material. The protective film may be, for example, a sheet or a foil.

The protective film may be made of a plastic material, such as a polymer. For example, the protective film may be made of a polyolefin, such as polyethylene (PE), polypropylene (PP) or polybutylene (PB).

The protective film may have a thickness in the range of 5 to 500 μm, preferably 5 to 200 μm, more preferably 8 to 100 μm, even more preferably 10 to 80 μm and yet even more preferably 12 to 50 μm. Particularly preferably, the protective film has a thickness in the range of 80 to 150 μm.

The protective film may have any type of shape. In a top view thereon, the protective film may have, for example, a circular shape, an oval shape, an elliptical shape or a polygonal shape, such as a rectangular shape or a square shape.

The protective film may be attached to the first side of the substrate with an adhesive. The adhesive may be present on an entire front surface of the protective film which comes into contact with the first side of the substrate. For example, the protective film may be a UV curable adhesive tape.

Alternatively, the protective film may be attached to the first side of the substrate so that at least a central area of the front surface of the protective film is in direct contact with the first side of the substrate, such that no adhesive is present between at least the central area of the front surface of the protective film and the first side of the substrate.

By attaching the protective film to the first side of the substrate so that at least the central area of the front surface of the protective film is in direct contact with the first side of the substrate, the risk of a possible contamination of or damage to the substrate, e.g., due to an adhesive force of an adhesive layer or adhesive residues on the substrate, can be significantly reduced or even eliminated.

The protective film may be attached to the first side of the substrate so that, in the entire region where the front surface of the protective film is in contact with the first side of the substrate, the front surface of the protective film is in direct contact with the first side of the substrate. Thus, no material, in particular, no adhesive, is present between the front surface of the protective film and the first side of the substrate.

In this way, the risk of a possible contamination of or damage to the substrate, e.g., due to an adhesive force of an adhesive layer or adhesive residues on the substrate, can be reliably eliminated.

The entire front surface of the protective film may be free of adhesive.

Attaching the protective film to the first side of the substrate so that at least the central area of the front surface of the protective film is in direct contact with the first side of the substrate further facilitates the step of inspecting the first side of the substrate for defects through the protective film. In particular, since no adhesive is present between at least the central area of the front surface of the protective film and the first side of the substrate, this inspection can be performed in a particularly efficient and reliable manner. For example, if the first side of the substrate is inspected for defects through the protective film by radiation, such as visible light, which is transmitted through the protective film, the radiation is not reflected, absorbed or scattered by an adhesive layer, at least in the central area of the front surface of the protective film.

An adhesive, e.g., an adhesive layer, may be provided only in a peripheral area of the front surface of the protective film. The peripheral area of the front surface of the protective film may be arranged so as to surround the central area of the front surface of the protective film.

The front surface of the protective film may be attached to the first side of the substrate so that the adhesive layer comes into contact only with a peripheral portion of the first side of the substrate. The peripheral portion of the first side of the substrate may be or correspond to a peripheral marginal area of the substrate.

By using such an adhesive layer, the attachment of the protective film to the substrate can be further improved. Moreover, since the adhesive layer is provided only in the peripheral area of the front surface of the protective film, the area in which protective film and substrate are attached to each other by the adhesive layer is significantly reduced as compared to a case where an adhesive layer is provided on the entire front surface of the protective film. Thus, the protective film can be detached from the substrate more easily and the risk of damage to the substrate is considerably reduced.

Attaching the protective film to the first side of the substrate may consist of or comprise applying an external stimulus to the protective film. By applying the external stimulus, an attachment force between protective film and substrate, holding the protective film in its position on the substrate, is generated. Hence, no additional adhesive material is necessary for attaching the protective film to the first side of the substrate.

In particular, by applying the external stimulus to the protective film, a form fit, such as a positive fit, and/or a material bond, such as an adhesive bond, may be formed between the protective film and the substrate.

Applying the external stimulus to the protective film may comprise or consist of heating the protective film and/or cooling the protective film and/or applying a vacuum to the protective film and/or irradiating the protective film with radiation, such as light, e.g., by using a laser beam.

The external stimulus may comprise or be a chemical compound and/or electron or plasma irradiation and/or a mechanical treatment, such as pressure, friction or ultrasound application, and/or static electricity.

A cushioning layer may be attached to a back surface of the protective film opposite to the front surface thereof. A front surface of the cushioning layer may be attached to the back surface of the protective film. The cushioning layer may have the properties, features and characteristics described above.

In particular, the cushioning layer may be curable by an external stimulus, such as UV radiation, heat, an electric field and/or a chemical agent. The method may further comprise applying the external stimulus to the cushioning layer so as to cure the cushioning layer.

A base sheet may be attached to a back surface of the cushioning layer opposite to the front surface thereof which is attached to the protective film. The base sheet may have the properties, features and characteristics described above.

Processing the substrate from the second side of the substrate may consist of or comprise dividing the substrate into a plurality of separate elements from the second side of the substrate. The separate elements may be, for example, chips or dies.

In this case, the method may comprise, after attaching the protective film to the first side of the substrate, dividing the substrate into the plurality of separate elements from the second side of the substrate, after dividing the substrate into the plurality of separate elements, inspecting the second side of the divided substrate for defects from the second side of the divided substrate and, after inspecting the second side of the divided substrate for defects, attaching the support film to the second side of the divided substrate. Further, the method may comprise removing the protective film from the first side of the divided substrate and, after removing the protective film from the first side of the divided substrate, inspecting the first side of the divided substrate for defects from the first side of the divided substrate.

With the method of the present invention, defective elements, such as defective chips or dies, can be efficiently and reliably identified and traced by inspecting the substrate, i.e., the divided substrate, rather than individually inspecting each element.

Processing the substrate from the second side of the substrate may consist of or comprise cutting the substrate along a thickness direction of the substrate. The thickness direction extends from the second side of the substrate towards the first side of the substrate.

Dividing the substrate into the plurality of separate elements may consist of or comprise cutting the substrate along the thickness direction of the substrate.

The substrate may be cut along its entire thickness, so as to fully divide the substrate, or along only part of its thickness.

One or more division lines may be formed on the first side and/or the second side of the substrate. If the substrate has, on the first side and/or on the second side of the substrate, a device area with a plurality of devices, the devices may be partitioned by the one or more division lines. Preferably, the device area and the one or more division lines are formed on the first side of the substrate.

Processing the substrate from the second side of the substrate may consist of or comprise cutting the substrate along the one or more division lines.

Dividing the substrate into the plurality of separate elements may consist of or comprise cutting the substrate along the one or more division lines.

Cutting the substrate along the thickness direction of the substrate may consist of or comprise mechanically cutting the substrate and/or laser cutting the substrate and/or plasma cutting the substrate. For example, the substrate may be mechanically cut by blade dicing or sawing.

The substrate may be cut in a single mechanical cutting step, a single laser cutting step or a single plasma cutting step. Alternatively, the substrate may be cut by a sequence of mechanical cutting and/or laser cutting and/or plasma cutting steps.

If the device area and the one or more division lines are formed on the first side of the substrate and the substrate is cut along the one or more division lines from the first substrate side, e.g., by mechanical cutting, such as blade dicing or sawing, or by laser cutting, the quality of the devices in the device area may be affected by the cutting process. This applies, in particular, if the substrate is cut along its entire thickness rather than along only part of its thickness. For instance, problems such as front side and/or back side chipping, contamination of the device area and degradation of the die strength of resulting chips or dies, obtained by dividing the substrate, may occur. If the device area and the one or more division lines are formed on the first side of the substrate but not on the second side of the substrate, these problems can be reliably avoided by cutting the substrate along the one or more division lines from its second side. Optionally, a metal layer or metal coating may be present on the second side of the substrate, in particular, on the entire second side of the substrate.

Laser cutting may be performed, for example, by ablation laser cutting and/or by stealth laser cutting, i.e., by forming modified regions within the substrate by the application of a laser beam, as will be further detailed below, and/or by forming a plurality of hole regions in the substrate by the application of a laser beam. Each of these hole regions may be composed of a modified region and a space in the modified region open to a surface of the substrate.

In a stealth laser cutting process, a laser beam having a wavelength that allows transmission of the laser beam through the substrate is applied to the substrate. Thus, the substrate is made of a material which is transparent to the laser beam. The laser beam is applied to the substrate at least in a plurality of positions so as to form a plurality of modified regions in the substrate, e.g., inside or within the bulk of the substrate. In particular, the laser beam may be applied to the substrate at least in a plurality of positions along at least one division line so as to form a plurality of modified regions in the substrate along the at least one division line.

The laser beam may be a pulsed laser beam. The pulsed laser beam may have a pulse width, for example, in the range of 1 fs to 1000 ns.

The modified regions are regions of the substrate which have been modified by the application of the laser beam. The modified regions may be regions of the substrate in which the structure of the substrate material has been modified. The modified regions may be regions of the substrate in which the substrate has been damaged. The modified regions may comprise amorphous regions or regions in which cracks are formed or may be amorphous regions or regions in which cracks are formed.

By forming these modified regions, the strength of the substrate in the areas thereof where the modified regions are formed is reduced. Hence, the division of the substrate, e.g., along the at least one division line, where the plurality of modified regions has been formed is greatly facilitated.

The substrate may be fully divided in the stealth laser cutting process, e.g., if cracks in the substrate extend from the modified regions to the first and second sides of the substrate. If the substrate is not fully divided in the stealth laser cutting process, the method may further comprise fully dividing the substrate, e.g., by applying an external force thereto. For example, an external force may be applied to the substrate by radially expanding the support film, i.e., by using the support film as an expansion tape, e.g., by means of an expansion drum. Alternatively, an external force may be applied to the substrate by expanding the support film, e.g., using expanding bars. For example, the expanding apparatus described in DE 10 2018 207 498 A1 may be used for expanding the support film. Also in this case, the support film may be used as an expansion tape. Before expanding the support film, an additional breaking step can be performed in order to break the substrate along the areas where the modified regions are formed.

If the substrate has been fully divided in the stealth laser cutting process, the support film may be expanded, e.g., radially expanded, in order to increase the distance between adjacent separate elements, such as chips or dies. In this way, the risk of damaging these elements when picking them up from the support film in a subsequent step can be significantly reduced.

Before attaching the protective film to the first side of the substrate, the substrate may be cut from the first side along part of its thickness. In this way, a layer or layers formed on the first side, such as a low-k layer or a metal layer, can be removed in the regions where the substrate is to be divided. For example, the substrate may be cut along part of its thickness along one or more division lines. The substrate may be cut along part of its thickness by mechanical cutting, e.g., using a blade or a saw, and/or by laser cutting or laser grooving.

Before or after attaching the protective film to the first side of the substrate, a stealth laser cutting process may be performed on the substrate from the first side of the substrate. For example, the stealth laser cutting process may be performed along one or more division lines. Performing the stealth laser cutting process on the substrate from the first side of the substrate is particularly advantageous for the case of narrow division lines, e.g., division lines having widths of 20 µm or less.

If the stealth laser cutting process is performed after attaching the protective film to the first side of the substrate, the laser beam is applied to the substrate through the protective film. In this case, the wavelength of the laser beam is chosen so that the laser beam is transmitted through the protective film, i.e., so that the protective film is transparent for the laser beam.

The method of the invention may further comprise, after inspecting the first side of the substrate, in particular, the divided substrate, for defects from the first side of the substrate, picking up the separate elements, i.e., the separate elements obtained by dividing the substrate, from the support film. The separate elements may be, for example, chips or dies. Each separate element, in particular, each chip or die, may comprise one or more devices of the devices formed in the device area, if present.

The separate elements are thus picked up from the support film after the first side of the substrate has been inspected for defects from the first side of the substrate. Hence, defective elements can be identified and traced by inspecting the substrate, in particular, by relying on information on the position of each element in the substrate, rather than by individually inspecting each element. Therefore, the method can be performed with a particularly high degree of efficiency.

By removing the protective film from the first side of the substrate, in particular, the divided substrate, particulates, such as chippings or debris, which have been separated from the substrate during processing, in particular, dividing, but remain on the substrate due to the presence of the protective film, can also be removed. In particular, these particulates may adhere to the protective film, e.g., due to the presence of an adhesive on the protective film or due to a material bond between particulates and protective film, so that they are removed from the substrate together with the protective film.

The separate elements are picked up from the support film after removing the protective film from the first side of the substrate. Thus, the amount of particulates present on the separate elements when they are picked up is greatly reduced. The separate elements even may be substantially free of such particulates. Therefore, separate elements with a high quality are obtained and further processing, handling and/or transport of the separate elements can be rendered considerably more efficient. For example, the separate elements, such as chips or dies, may be put to use, e.g., assembled into semiconductor package devices or incorporated in electronic equipment, directly after they have been picked up from the support film.

Processing the substrate from the second side of the substrate may consist of or comprise thinning the substrate so as to reduce the thickness of the substrate. Thinning of the substrate may be performed before and/or after dividing the substrate into a plurality of separate elements from the second side of the substrate.

Thinning the substrate may consist of or comprise grinding the substrate from the second side of the substrate and/or polishing the substrate from the second side of the substrate and/or etching the substrate from the second side of the substrate.

The invention further provides a system for processing a substrate, the substrate having a first side and a second side being opposite to the first side. The system comprises an attaching means configured to attach a protective film to the first side of the substrate, a processing means configured to process the substrate from the second side of the substrate, after attaching the protective film to the first side of the substrate, and an inspection means configured to inspect the second side of the substrate for defects from the second side of the substrate, after processing the substrate from the second side of the substrate. The system further comprises an attaching means configured to attach a support film to the second side of the substrate, after inspecting the second side of the substrate for defects, a protective film removing means configured to remove the protective film from the first side of the substrate, and an inspection means configured to inspect the first side of the substrate for defects from the first side of the substrate, after removing the protective film from the first side of the substrate.

The substrate processing system of the invention is a system configured for performing the substrate processing method of the invention. The substrate processing system thus provides the technical effects and advantages already described in detail above for the substrate processing method.

The features described above for the substrate processing method of the invention also apply to the substrate processing system of the invention.

In particular, the substrate, the protective film and the support film may be the same as described above. The protective film and/or the support film may have a cushioning layer or a cushioning layer and a base sheet attached thereto, as has been described above.

The substrate processing system may comprise a control for controlling the system, in particular, for controlling the components of the system. The control may comprise a plurality of control units, e.g., control units for controlling different components of the system. The control units may be separate or individual control units.

The control may be configured to control the substrate processing system so as to perform the substrate processing method of the invention.

The control may be configured to control the attaching means so as to attach the protective film to the first side of the substrate. The control may be configured to control the processing means so as to process the substrate from the second side of the substrate, after attaching the protective film to the first side of the substrate. The control may be configured to control the inspection means so as to inspect the second side of the substrate for defects from the second side of the substrate, after processing the substrate from the second side of the substrate. The control may be configured to control the attaching means so as to attach the support film to the second side of the substrate, after inspecting the second side of the substrate for defects. The control may be configured to control the protective film removing means so as to remove the protective film from the first side of the substrate. The control may be configured to control the inspection means so as to inspect the first side of the substrate for defects from the first side of the substrate, after removing the protective film from the first side of the substrate.

The substrate processing system of the invention may consist of or comprise a single apparatus or machine. Alternatively, the substrate processing system of the invention may consist of or comprise a plurality of apparatuses or machines, e.g., a plurality of separate or individual apparatuses or machines. These apparatuses or machines may be arranged, e.g., connected to each other, so as to form an in-line system. One, some or all of the apparatuses or machines may be configured to perform one step or a plurality of steps of the substrate processing method of the invention.

The substrate processing system may further comprise a position determining means configured to determine a position or positions of an identified defect or identified defects, thereby obtaining first positional information, if a defect or defects is or are identified by inspecting the second side of the substrate for defects from the second side of the substrate. The control may be configured to control the position determining means so as to determine a position or positions of an identified defect or identified defects, thereby obtaining first positional information, if a defect or defects is or are identified by inspecting the second side of the substrate for defects from the second side of the substrate. The first positional information is information specifying the position of each defect on the second side of the substrate. The position of each defect may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each defect may be defined in relation to an element, such as a centre, or elements of a supporting means supporting the substrate, e.g., a chuck table, and/or in relation to a seal ring or seal rings and/or in relation to a guard ring or guard rings.

The first positional information may consist of or comprise the following information: a distance or distances of the defect or defects from an element or elements of the substrate, such as a fiducial mark of the substrate, an alignment mark of the substrate, an edge of the substrate, a notch of the substrate, such as a wafer notch, an orientation flat of the substrate and/or a centre of the substrate; and/or a distance or distances of the defect or defects from an element, such as a centre, or elements of a supporting means supporting the substrate, e.g., a chuck table; and/or a size or sizes of the defect or defects; and/or a distance or distances of the defect or defects from a seal ring or seal rings; and/or a distance or distances of the defect or defects from a guard ring or guard rings.

The position determining means may consist of or comprise data processing equipment, e.g., having software, a data communication set-up and/or a control function.

The substrate processing system may further comprise a position determining means configured to determine a position or positions of an identified defect or identified defects, thereby obtaining second positional information, if a defect or defects is or are identified by inspecting the first side of the substrate for defects from the first side of the substrate, after removing the protective film from the first side of the substrate. The control may be configured to control the position determining means so as to determine a position or positions of an identified defect or identified defects, thereby obtaining second positional information, if a defect or defects is or are identified by inspecting the first side of the substrate for defects from the first side of the substrate, after removing the protective film from the first side of the substrate. The second positional information is information specifying the position of each defect on the first side of the substrate. The position of each defect may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each defect may be defined in relation to an element, such as a centre, or elements of a supporting means supporting the substrate, e.g., a chuck table, and/or in relation to a seal ring or seal rings and/or in relation to a guard ring or guard rings.

The second positional information may consist of or comprise the following information: a distance or distances of the defect or defects from an element or elements of the substrate, such as a fiducial mark of the substrate, an alignment mark of the substrate, an edge of the substrate, a notch of the substrate, such as a wafer notch, an orientation flat of the substrate and/or a centre of the substrate; and/or a distance or distances of the defect or defects from an element, such as a centre, or elements of a supporting means supporting the substrate, e.g., a chuck table; and/or a size or sizes of the defect or defects; and/or a distance or distances of the defect or defects from a seal ring or seal rings; and/or a distance or distances of the defect or defects from a guard ring or guard rings.

The position determining means may consist of or comprise data processing equipment, e.g., having software, a data communication set-up and/or a control function.

The position determining means configured to determine the position or positions of a defect or defects on the second side of the substrate and the position determining means configured to determine the position or positions of a defect or defects on the first side of the substrate may be the same single position determining means. Alternatively, a first position determining means may be used for determining the position or positions of a defect or defects on the second side of the substrate and a different second position determining means may be used for determining the position or positions of a defect or defects on the first side of the substrate. The first position determining means may consist of or comprise data processing equipment, e.g., having software, a data communication set-up and/or a control function. The second position determining means may consist of or comprise data processing equipment, e.g., having software, a data communication set-up and/or a control function.

The control may be configured to correlate the first and/or second positional information with information on the position of particular portions or regions of the substrate, for example, portions or regions in which devices, electrical interconnections or the like are formed. In particular, the control may be configured to correlate the first and/or second positional information with information on the position of each element to be obtained by dividing the substrate in the substrate.

The substrate processing system may further comprise an inspection means configured to inspect the first side of the substrate for defects through the protective film before removing the protective film from the first side of the substrate. The control may be configured to control the inspection means so as to inspect the first side of the substrate for defects through the protective film before removing the protective film from the first side of the substrate.

The inspection means may be configured to inspect the first side of the substrate for defects through the protective film before attaching the support film to the second side of the substrate. The inspection means may be configured to inspect the first side of the substrate for defects through the protective film after attaching the support film to the second side of the substrate.

The control may be configured to control the inspection means so as to inspect the first side of the substrate for defects through the protective film before attaching the support film to the second side of the substrate. The control may be configured to control the inspection means so as to inspect the first side of the substrate for defects through the protective film after attaching the support film to the second side of the substrate.

The substrate processing system may further comprise a position determining means configured to determine a position or positions of an identified defect or identified defects, thereby obtaining third positional information, if a defect or defects is or are identified by inspecting the first side of the substrate for defects through the protective film. The control may be configured to control the position determining means so as to determine a position or positions of an identified defect or identified defects, thereby obtaining third positional information, if a defect or defects is or are identified by inspecting the first side of the substrate for defects through the protective film. The third positional information is information specifying the position of each defect on the first side of the substrate. The position of each defect may be defined in a coordinate system of the substrate, e.g., in relation to division lines and/or devices formed on the substrate and/or in relation to another element or elements of the substrate. The element or elements of the substrate may be or comprise one or more of a fiducial mark of the substrate, an alignment mark of the substrate, an edge of the substrate, a notch of the substrate, such as a wafer notch, an orientation flat of the substrate and a centre of the substrate. The position of each defect may be defined in relation to an element, such as a centre, or elements of a supporting means supporting the substrate, e.g., a chuck table, and/or in relation to a seal ring or seal rings and/or in relation to a guard ring or guard rings.

The third positional information may consist of or comprise the following information: a distance or distances of the defect or defects from an element or elements of the substrate, such as a fiducial mark of the substrate, an alignment mark of the substrate, an edge of the substrate, a notch of the substrate, such as a wafer notch, an orientation flat of the substrate and/or a centre of the substrate; and/or a distance or distances of the defect or defects from an element, such as a centre, or elements of a supporting means supporting the substrate, e.g., a chuck table; and/or a size or sizes of the defect or defects; and/or a distance or distances of the defect or defects from a seal ring or seal rings; and/or a distance or distances of the defect or defects from a guard ring or guard rings.

The position determining means may consist of or comprise data processing equipment, e.g., having software, a data communication set-up and/or a control function.

The position determining means configured to determine the position or positions of a defect or defects identified on the first side of the substrate through the protective film may be the same single position determining means as the position determining means configured to determine the position or positions of a defect or defects on the second side of the substrate and/or the position determining means configured to determine the position or positions of a defect or defects on the first side of the substrate after removing the protective film from the first side of the substrate. Alternatively, a different third position determining means may be used for determining the position or positions of a defect or defects identified on the first side of the substrate through the protective film. The third position determining means may consist of or comprise data processing equipment, e.g., having software, a data communication set-up and/or a control function.

The control may be configured to correlate the first positional information with the second positional information. The control may be configured to correlate the first positional information with the second positional information and/or with the third positional information.

The inspection means configured to inspect the second side of the substrate and the inspection means configured to inspect the first side of the substrate, after removing the protective film from the first side of the substrate, may be the same single inspection means. The inspection means configured to inspect the first side of the substrate for defects through the protective film before removing the protective film from the first side of the substrate may be the same single inspection means as the inspection means configured to inspect the second side of the substrate and/or the inspection means configured to inspect the first side of the substrate, after removing the protective film from the first side of the substrate.

The inspection means may be arranged on or in the processing means configured to process the substrate from the second side of the substrate. The inspection means may form part of the processing means.

Alternatively, the inspection means may be arranged outside the processing means. For example, the inspection means may be arranged in a separate inspection equipment, such as an optical inspection equipment.

The inspection means may be, for example, a camera, such as a microscope camera for optical inspection.

Alternatively, a first inspection means may be used for inspecting the second side of the substrate for defects from the second side of the substrate and a different second inspection means may be used for inspecting the first side of the substrate for defects from the first side of the substrate, after removing the protective film from the first side of the substrate. The second inspection means or a different third inspection means may be used for inspecting the first side of the substrate for defects through the protective film.

One, two or all of the first to third inspection means may be arranged on or in the processing means configured to process the substrate from the second side of the substrate. One, two or all of the first to third inspection means may form part of the processing means.

One, two or all of the first to third inspection means may be arranged outside the processing means. For example, one, two or all of the first to third inspection means may be arranged in a separate inspection equipment, such as an optical inspection equipment. All of the first to third inspection means may be arranged in the same separate inspection equipment. Each of the first to third inspection means may be arranged in a different separate inspection equipment.

The first inspection means may be, for example, a camera, such as a microscope camera for optical inspection. The second inspection means may be, for example, a camera, such as a microscope camera for optical inspection. The third inspection means may be, for example, a camera, such as a microscope camera for optical inspection.

The attaching means may be configured to attach the support film to the second side of the substrate so that at least a central area of the front surface of the support film is in direct contact with the second side of the substrate, such that no adhesive is present between at least the central area of the front surface of the support film and the second side of the substrate. The control may be configured to control the attaching means so as to attach the support film to the second side of the substrate so that at least the central area of the front surface of the support film is in direct contact with the second side of the substrate, such that no adhesive is present between at least the central area of the front surface of the support film and the second side of the substrate.

The attaching means may be configured to attach the support film to the second side of the substrate so that, in the entire region where the front surface of the support film comes into contact with the second side of the substrate, the front surface of the support film is in direct contact with the second side of the substrate. The control may be configured to control the attaching means so as to attach the support film to the second side of the substrate so that, in the entire region where the front surface of the support film comes into contact with the second side of the substrate, the front surface of the support film is in direct contact with the second side of the substrate.

An adhesive, e.g., an adhesive layer, may be provided only in a peripheral area of the front surface of the support film. The peripheral area of the front surface of the support film may be arranged so as to surround the central area of the front surface of the support film.

The attaching means may be configured to attach the front surface of the support film to the second side of the substrate so that the adhesive layer comes into contact only with a peripheral portion of the second side of the substrate. The control may be configured to control the attaching means so as to attach the front surface of the support film to the second side of the substrate so that the adhesive layer comes into contact only with a peripheral portion of the second side of the substrate. The peripheral portion of the second side of the substrate may be or correspond to a peripheral marginal area of the substrate.

The substrate processing system, in particular, the attaching means, may comprise an external stimulus applying means configured to apply an external stimulus to the support film. The control may be configured to control the external stimulus applying means so as to apply the external stimulus to the support film. By applying the external stimulus, an attachment force between support film and substrate, holding the support film in its position on the substrate, is generated. The external stimulus may be as described above.

The external stimulus applying means may consist of or comprise a heating means configured to heat the support film and/or a cooling means configured to cool the support film and/or a vacuum applying means configured to apply a vacuum to the support film and/or an irradiation means configured to irradiate the support film with radiation, such as light, e.g., by using a laser beam.

The attaching means may be configured to attach the protective film to the first side of the substrate so that at least a central area of the front surface of the protective film is in direct contact with the first side of the substrate, such that no adhesive is present between at least the central area of the front surface of the protective film and the first side of the substrate. The control may be configured to control the attaching means so as to attach the protective film to the first side of the substrate so that at least the central area of the front surface of the protective film is in direct contact with the first side of the substrate, such that no adhesive is present between at least the central area of the front surface of the protective film and the first side of the substrate.

The attaching means may be configured to attach the protective film to the first side of the substrate so that, in the entire region where the front surface of the protective film comes into contact with the first side of the substrate, the front surface of the protective film is in direct contact with the first side of the substrate. The control may be configured to control the attaching means so as to attach the protective film to the first side of the substrate so that, in the entire region where the front surface of the protective film comes into contact with the first side of the substrate, the front surface of the protective film is in direct contact with the first side of the substrate.

An adhesive, e.g., an adhesive layer, may be provided only in a peripheral area of the front surface of the protective film. The peripheral area of the front surface of the protective film may be arranged so as to surround the central area of the front surface of the protective film.

The attaching means may be configured to attach the front surface of the protective film to the first side of the substrate so that the adhesive layer comes into contact only with a peripheral portion of the first side of the substrate. The control may be configured to control the attaching means so as to attach the front surface of the protective film to the first side of the substrate so that the adhesive layer comes into contact only with a peripheral portion of the first side of the substrate. The peripheral portion of the first side of the substrate may be or correspond to a peripheral marginal area of the substrate.

The substrate processing system, in particular, the attaching means, may comprise an external stimulus applying means configured to apply an external stimulus to the protective film. The control may be configured to control the external stimulus applying means so as to apply the external stimulus to the protective film. By applying the external stimulus, an attachment force between protective film and substrate, holding the protective film in its position on the substrate, is generated. The external stimulus may be as described above.

The external stimulus applying means may consist of or comprise a heating means configured to heat the protective film and/or a cooling means configured to cool the protective film and/or a vacuum applying means configured to apply a vacuum to the protective film and/or an irradiation means configured to irradiate the protective film with radiation, such as light, e.g., by using a laser beam.

The attaching means configured to attach the protective film to the first side of the substrate and the attaching means configured to attach the support film to the second side of the substrate may be the same single attaching means. Alternatively, a first attaching means may be used for attaching the protective film to the first side of the substrate and a different second attaching means may be used for attaching the support film to the second side of the substrate.

The attaching means configured to attach the protective film to the first side of the substrate may be different from the protective film removing means configured to remove the protective film from the first side of the substrate.

The attaching means configured to attach the support film to the second side of the substrate and the protective film removing means configured to remove the protective film from the first side of the substrate may be the same single means. In this case, the same single means is used for attaching the support film to the second side of the substrate and for removing the protective film from the first side of the substrate. For example, this same single means may consist of or comprise a mounter and peeler system.

The external stimulus applying means configured to apply an external stimulus to the support film and the external stimulus applying means configured to apply an external stimulus to the protective film may be the same single external stimulus applying means. Alternatively, a first external stimulus applying means may be used for applying an external stimulus to the support film and a different second external stimulus applying means may be used for applying an external stimulus to the protective film.

The processing means may consist of or comprise a dividing means configured to divide the substrate into a plurality of separate elements from the second side of the substrate. The control may be configured to control the dividing means so as to divide the substrate into a plurality of separate elements from the second side of the substrate. The separate elements may be as described above.

The processing means, in particular, the dividing means, may consist of or comprise a cutting means configured to cut the substrate along the thickness direction of the substrate. The control may be configured to control the cutting means so as to cut the substrate along the thickness direction of the substrate. The control may be configured to control the cutting means so as to cut the substrate along its entire thickness, thereby fully dividing the substrate, or along only part of its thickness.

The cutting means may consist of or comprise a mechanical cutting means and/or a laser cutting means and/or a plasma cutting means. For example, the mechanical cutting means may consist of or comprise a blade or a saw.

The laser cutting means may be configured to perform laser cutting, for example, by ablation laser cutting and/or by stealth laser cutting, i.e., by forming modified regions within the substrate by the application of a laser beam, as has been detailed above, and/or by forming a plurality of hole regions in the substrate by the application of a laser beam. For example, the laser cutting means may be a stealth laser cutting means.

The laser cutting means may be configured to emit a pulsed laser beam. The pulsed laser beam may have a pulse width, for example, in the range of 1 fs to 1000 ns.

The substrate processing system may further comprise an external force applying means configured to apply an external force to the substrate. The control may be configured to control the external force applying means so as to apply an external force to the substrate. The external force applying means may consist of or comprise an expansion means configured to expand, e.g., radially expand, the support film. The control may be configured to control the expansion means so as to expand the support film.

The substrate processing system may further comprise a breaking means configured to break the substrate, in particular, along areas of the substrate where modified regions are formed. The control may be configured to control the breaking means so as to break the substrate.

The substrate processing system may further comprise a pick-up means configured to pick up the separate elements from the support film, after inspecting the first side of the substrate for defects from the first side of the substrate. The control may be configured to control the pick-up means so as to pick up the separate elements from the support film, after inspecting the first side of the substrate for defects from the first side of the substrate.

The substrate processing system may further comprise a substrate thinning means configured to thin the substrate so as to reduce the thickness of the substrate. The control may be configured to control the substrate thinning means so as to thin the substrate. The substrate thinning means may be configured to thin the substrate before and/or after dividing the substrate into a plurality of separate elements from the second side of the substrate. The control may be configured to control the substrate thinning means so as to thin the substrate before and/or after dividing the substrate into a plurality of separate elements from the second side of the substrate.

The substrate thinning means may consist of or comprise a grinding means configured to grind the substrate from the second side of the substrate and/or a polishing means configured to polish the substrate from the second side of the substrate and/or an etching means configured to etch the substrate from the second side of the substrate.

BRIEF DESCRIPTION OF THE DRAWINGS

Hereinafter, non-limiting examples of the invention are explained with reference to the drawings, in which.

DETAILED DESCRIPTION OF PREFERRED EMBODIMENTS

Preferred embodiments of the present invention will now be described with reference to the accompanying drawings. The preferred embodiments relate to methods of processing a substrate and to substrate processing systems for performing these methods.

Figure 1:
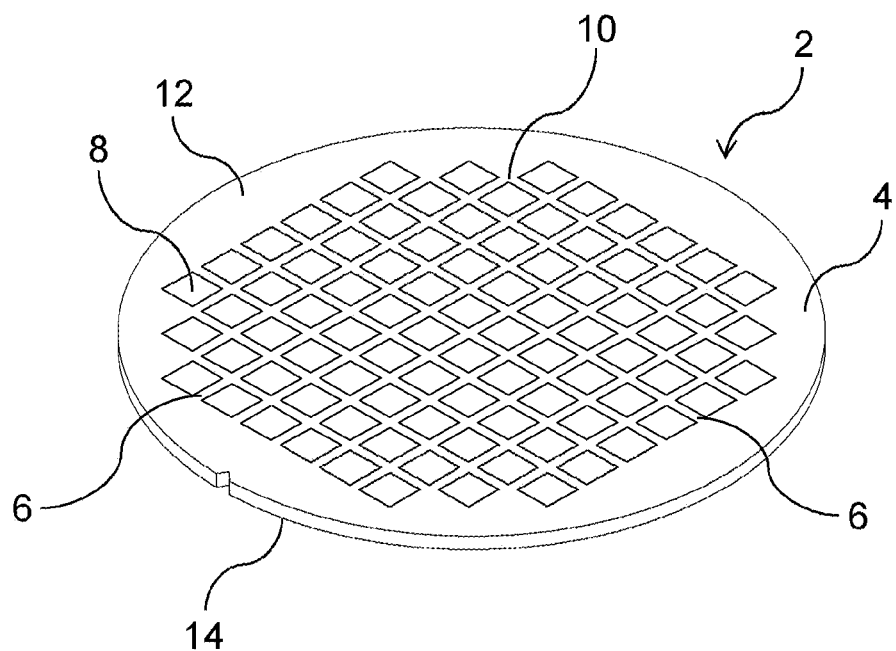
FIG. 1 is a perspective view showing a wafer as a substrate to be processed by methods of the present invention.

In the first to fourth embodiments, the processing method of the invention is performed on a wafer 2 as the substrate (see FIG. 1). The wafer 2 can be, for example, a MEMS wafer having MEMS devices formed on the surface of a first side 4, i.e., a front side, thereof. However, the wafer 2 is not limited to a MEMS wafer, but may also be a CMOS wafer having CMOS devices, preferably as solid-state imaging devices, formed on the first side 4 thereof or a wafer with other types of devices on the first side 4.

The wafer 2 may be made of a semiconductor, e.g., silicon (Si). Such a silicon wafer 2 can include devices, such as ICs (integrated circuits) and LSIs (large scale integrations), on a silicon substrate. Alternatively, the wafer 2 may be an optical device wafer configured by forming optical devices, such as LEDs (light emitting diodes), on an inorganic material substrate of, for example, ceramic, glass or sapphire. The wafer 2 is not limited to this and can be formed in any other way. Furthermore, also a combination of the above described exemplary wafer designs is possible.

The wafer 2 can have a thickness in the μm range, preferably in the range of 30 to 1000 μm.

The wafer 2 preferably exhibits a circular shape. However, the shape of the wafer 2 is not particularly limited. In other embodiments, the wafer 2 may have, for example, an oval shape, an elliptical shape or a polygonal shape, such as a rectangular shape or a square shape.

The wafer 2 is provided with a plurality of crossing division lines 6 (see FIG. 1), also termed streets, formed on the first side 4 thereof, thereby partitioning the wafer 2 into a plurality of rectangular regions where devices 8, such as those described previously, are respectively formed. These devices 8 are formed in a device area 10 of the wafer 2. In the case of a circular wafer 2, this device area 10 is preferably substantially circular and arranged concentrically with the outer circumference of the wafer 2.

The device area 10 is surrounded by an annular peripheral marginal area 12, as is schematically shown in FIG. 1. In this peripheral marginal area 12, no devices are formed. The peripheral marginal area 12 is preferably arranged concentrically to the device area 10 and/or the outer circumference of the wafer 2. The radial extension of the peripheral marginal area 12 can be in the mm range and preferably ranges from 1 to 3 mm.

The wafer 2 further has a second side 14, i.e., a back side, opposite to the first side 4 (see FIG. 1).

In the following, a first embodiment of the present invention will be described with reference to FIGS. 1 to 10.

Figure 2:
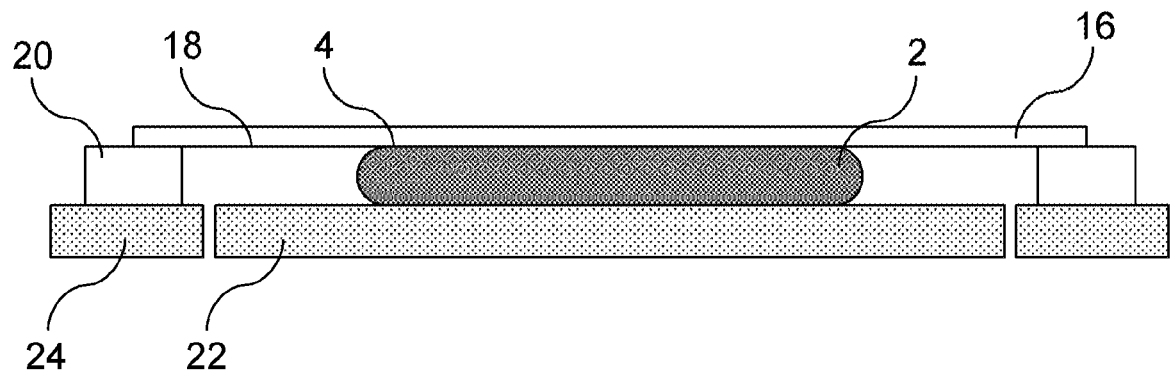
FIG. 2 is a cross-sectional view illustrating a step of attaching a protective film to a first side of the wafer in a method according to a first embodiment of the present invention.

As is shown in FIG. 2, a protective film 16 is attached to the first side 4 of the wafer 2. The protective film 16 covers the devices 8 formed in the device area 10 and thus protects the devices 8, e.g., from contamination and damage. Optionally, before attaching the protective film 16 to the first side 4 of the wafer 2, the wafer 2 may be cut from the first side 4 along part of its thickness, in particular, along the division lines 6. The thickness of the wafer 2 is the distance between the first side 4 and the second side 14. In this way, if a layer or layers is or are formed on the first side 4, such as a low-k layer or a metal layer, the layer or layers can be removed in the regions where the wafer 2 is to be divided, in particular, along the division lines 6. For example, the wafer 2 may be cut along part of its thickness by mechanical cutting, e.g., using a blade or a saw, and/or by laser cutting or laser grooving.

The protective film 16 may be made of a plastic material, such as a polymer. For example, the protective film 16 may be made of a polyolefin, such as polyethylene (PE), polypropylene (PP) or polybutylene (PB). The protective film 16 may have a thickness in the range of 5 to 500 μm, preferably 5 to 200 μm, more preferably 8 to 100 μm, even more preferably 10 to 80 μm and yet even more preferably 12 to 50 μm. In the present embodiment, the protective film 16 has a substantially circular shape in a top view thereon and a diameter which is larger than the diameter of the wafer 2.

The protective film 16 may be attached to the first side 4 of the wafer 2 with an adhesive. The adhesive may be present on an entire front surface 18 of the protective film 16 which comes into contact with the first side 4 of the wafer 2. For example, the protective film 16 may be a UV curable adhesive tape. Alternatively, the protective film 16 may be attached to the first side 4 of the wafer 2 so that at least a central area of the front surface 18 of the protective film 16 is in direct contact with the first side 4 of the wafer 2, such that no adhesive is present between at least the central area of the front surface 18 of the protective film 16 and the first side 4 of the wafer 2. The protective film 16 may be attached to the first side 4 of the wafer 2 so that, in the entire region where the front surface 18 of the protective film 16 is in contact with the first side 4 of the wafer 2, the front surface 18 of the protective film 16 is in direct contact with the first side 4 of the wafer 2. The entire front surface 18 of the protective film 16 may be free of adhesive.

An adhesive, e.g., an adhesive layer, may be provided only in a peripheral area of the front surface 18 of the protective film 16, as has been detailed above. The peripheral area of the front surface 18 of the protective film 16 may be arranged so as to surround the central area of the front surface 18 of the protective film 16.

A peripheral portion of the protective film 16 is attached to an annular frame 20 so that the protective film 16 closes a central opening of the annular frame 20, i.e., the area inside the inner diameter of the annular frame 20. The annular frame 20 facilitates handling of the protective film 16, in particular, in the process of attaching the protective film 16 to the first side 4 of the wafer 2.

The protective film 16 is attached to the first side 4 of the wafer 2 by a first attaching means comprising a chuck table 22 and an annular frame holder 24. The wafer 2 is supported by the chuck table 22, and the annular frame 20, having the protective film 16 attached thereto, is held by the annular frame holder 24, so that the protective film 16 can be reliably and accurately attached to the first side 4 of the wafer 2. For example, the first attaching means may be a tape laminator or a tape mounter. A vacuum chamber, a pressing roller, a pressing membrane, a pressing piece or block or a combination of these elements may be used for applying pressure to the protective film 16 so as to press the protective film 16 against the first side 4 of the wafer 2. The first attaching means forms part of a substrate processing system according to the present embodiment.

Attaching the protective film 16 to the first side 4 of the wafer 2 may comprise applying an external stimulus to the protective film 16, as has been detailed above. For this purpose, the first attaching means may further comprise an external stimulus applying means, such as a heating means, a cooling means, a vacuum applying means and/or an irradiation means.

Figure 3:
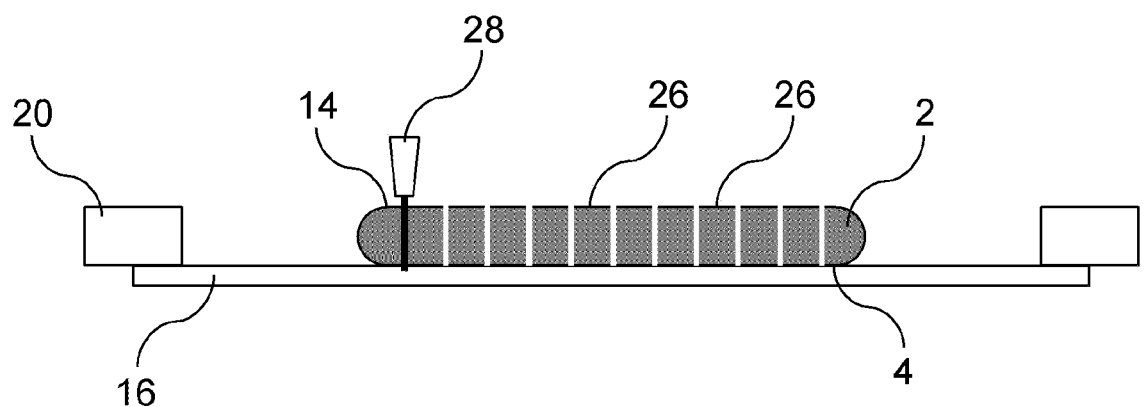
FIG. 3 is a cross-sectional view illustrating a step of processing the wafer from a second side of the wafer in the method according to the first embodiment.

After attaching the protective film 16 to the first side 4 of the wafer 2, the wafer 2 is processed from the second side 14 of the wafer 2, as is shown in FIG. 3. In the present embodiment, processing the wafer 2 from the second side 14 consists of cutting the wafer 2 along the division lines 6 over the entire thickness of the wafer 2. Hence, the wafer 2 is fully divided in the cutting process, thus obtaining a plurality of separate elements in the form of chips or dies 26. Each chip or die 26 comprises one of the devices 8 formed in the device area 10.

The wafer 2 is divided along the division lines 6 by a cutting means 28 (see FIG. 3). In the present embodiment, the cutting means 28 is a cutting blade configured to mechanically cut the wafer 2. The cutting means 28 forms part of the substrate processing system according to the present embodiment.

Alternatively, the wafer 2 may be cut along the division lines 6 by laser cutting and/or plasma cutting, as has been detailed above. Also, a sequence of mechanical cutting and/or laser cutting and/or plasma cutting steps may be applied.

Figure 4:
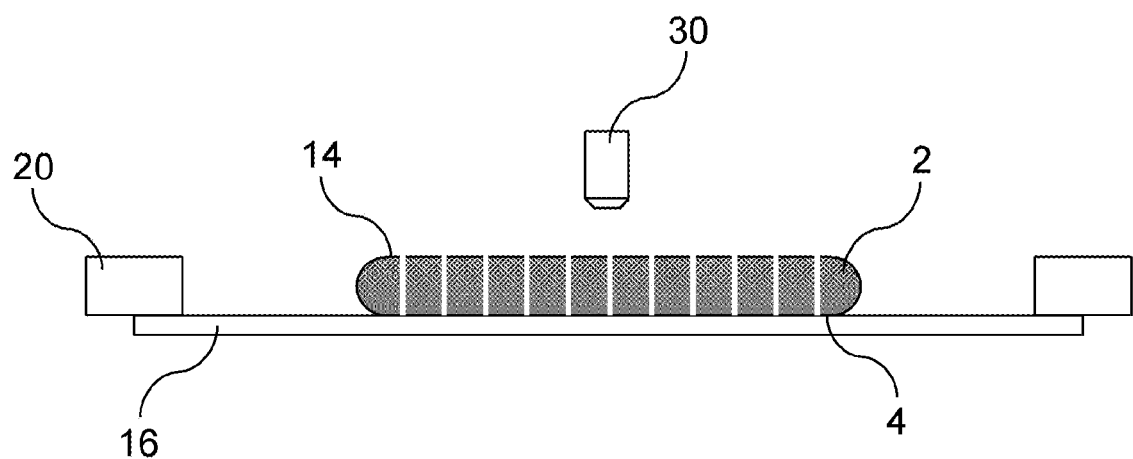
FIG. 4 is a cross-sectional view illustrating a step of inspecting the second side of the wafer for defects from the second side of the wafer in the method according to the first embodiment.

After dividing the wafer 2 into the plurality of chips or dies 26, the second side 14 of the divided wafer 2 is inspected for defects from the second side 14 of the divided wafer 2, as is shown in FIG. 4. Possible defects to be identified when inspecting the second side 14 of the divided wafer 2 include, for example, back side chipping, delamination of layers formed on or in the wafer material, cracks, non-straight cut lines (meandering), burrs, whiskers, particles, contaminations, die shifts, i.e., undesired movement of the chips or dies 26, and die size differences, e.g., caused by an undesired slant cut or a cutting width change because of cutting blade wear. This inspection step allows for defects in the divided wafer 2 originating from the cutting process to be identified.

The second side 14 of the divided wafer 2 is inspected for defects from the second side 14 by a first inspection means 30 (see FIG. 4), in particular, a camera, such as a microscope camera for optical inspection. The first inspection means 30 forms part of the substrate processing system according to the present embodiment.

If a defect or defects is or are identified by inspecting the second side 14 of the wafer 2, a position or positions of the identified defect or defects is or are determined, thereby obtaining first positional information. The substrate processing system according to the present embodiment may comprise a position determining means configured to perform this step. The first positional information is information specifying the position of each defect on the second side 14 of the divided wafer 2. The position of each defect may be defined in a coordinate system of the wafer 2, e.g., in relation to the division lines 6 and/or the devices 8.

The first positional information can be correlated with information on the position of each chip or die 26 in the divided wafer 2, allowing for defective chips or dies 26 to be identified and traced in a particularly accurate and efficient manner without having to individually inspect each chip or die 26, as has been detailed above. The substrate processing system according to the present embodiment may comprise a control configured to perform this step. The position of each chip or die 26 in the wafer 2 may be defined in a coordinate system of the wafer 2, e.g., in relation to the division lines 6 and/or the devices 8.

Figure 5:
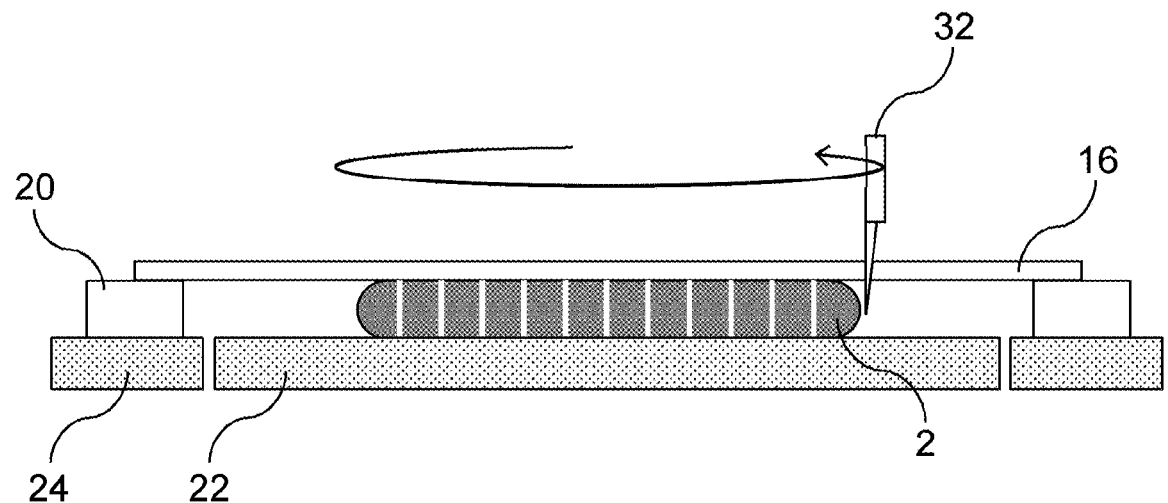
FIG. 5 is a cross-sectional view illustrating a step of cutting the protective film in the method according to the first embodiment.

The method of the present embodiment further comprises the optional step of cutting the protective film 16 after inspecting the second side 14 of the divided wafer 2 for defects from the second side 14 of the divided wafer 2, as is shown in FIG. 5. The protective film 16 is cut in a circular manner along the outer circumference of the divided wafer 2, as is indicated by a curved arrow in FIG. 5. A film cutting means 32, such as a cutting blade, is used for this cutting step. The film cutting means 32 forms part of the substrate processing system according to the present embodiment. During the cutting process, the wafer 2 is supported by the chuck table 22 of the first attaching means, and the annular frame 20 is held by the annular frame holder 24 of the first attaching means. The cut protective film 16 is shown, for example, in FIGS. 6 and 7.

By cutting the protective film 16 in this way, the diameter of the protective film 16 is reduced, so that the protective film 16 has substantially the same diameter as the wafer 2, thereby facilitating the further handling of the combination of protective film 16 and wafer 2.

Figure 6:
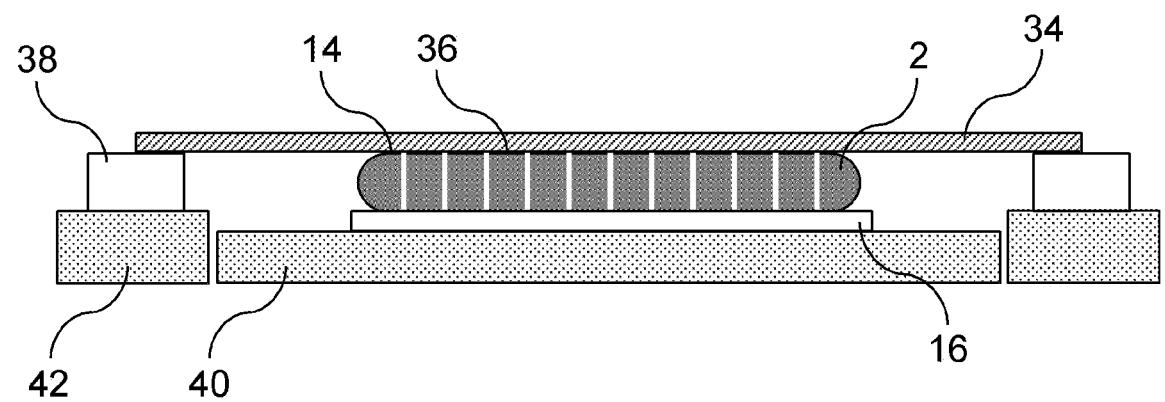
FIG. 6 is a cross-sectional view illustrating a step of attaching a support film to the second side of the wafer in the method according to the first embodiment.

After cutting the protective film 16, a support film 34 is attached to the second side 14 of the divided wafer 2, as is shown in FIG. 6. The support film 34 supports the divided wafer 2 and reliably holds the chips or dies 26 in their positions also after the protective film 16 has been removed from the divided wafer 2 (see FIG. 9).

The support film 34 may be made of a plastic material, such as a polymer. For example, the support film 34 may be made of a polyolefin, such as polyethylene (PE), polypropylene (PP) or polybutylene (PB). The support film 34 may have a thickness in the range of 5 to 500 μm, preferably 5 to 200 μm, more preferably 8 to 100 μm, even more preferably 10 to 80 μm and yet even more preferably 12 to 50 μm. In the present embodiment, the support film 34 has a substantially circular shape in a top view thereon and a diameter which is larger than the diameter of the wafer 2.

The support film 34 may be attached to the second side 14 of the divided wafer 2 with an adhesive. The adhesive may be present on an entire front surface 36 of the support film 34 which comes into contact with the second side 14 of the divided wafer 2. For example, the support film 34 may be a UV curable adhesive tape. Alternatively, the support film 34 may be attached to the second side 14 of the divided wafer 2 so that at least a central area of the front surface 36 of the support film 34 is in direct contact with the second side 14 of the divided wafer 2, such that no adhesive is present between at least the central area of the front surface 36 of the support film 34 and the second side 14 of the divided wafer 2. The support film 34 may be attached to the second side 14 of the divided wafer 2 so that, in the entire region where the front surface 36 of the support film 34 is in contact with the second side 14 of the divided wafer 2, the front surface 36 of the support film 34 is in direct contact with the second side 14 of the divided wafer 2. The entire front surface 36 of the support film 34 may be free of adhesive.

An adhesive, e.g., an adhesive layer, may be provided only in a peripheral area of the front surface 36 of the support film 34, as has been detailed above. The peripheral area of the front surface 36 of the support film 34 may be arranged so as to surround the central area of the front surface 36 of the support film 34.

A peripheral portion of the support film 34 is attached to an annular frame 38 so that the support film 34 closes a central opening of the annular frame 38, i.e., the area inside the inner diameter of the annular frame 38. The annular frame 38 facilitates handling of the support film 34, in particular, in the process of attaching the support film 34 to the second side 14 of the divided wafer 2.

The support film 34 is attached to the second side 14 of the divided wafer 2 by a second attaching means comprising a chuck table 40 and an annular frame holder 42. The divided wafer 2 is supported by the chuck table 40, and the annular frame 38, having the support film 34 attached thereto, is held by the annular frame holder 42, so that the support film 34 can be reliably and accurately attached to the second side 14 of the divided wafer 2. For example, the second attaching means may be a tape laminator or a tape mounter. A vacuum chamber, a pressing roller, a pressing membrane, a pressing piece or block or a combination of these elements may be used for applying pressure to the support film 34 so as to press the support film 34 against the second side 14 of the divided wafer 2. The second attaching means forms part of the substrate processing system according to the present embodiment.

In other embodiments of the present invention, the same single attaching means may be used as the first attaching means and the second attaching means.

Attaching the support film 34 to the second side 14 of the divided wafer 2 may comprise applying an external stimulus to the support film 34, as has been detailed above. For this purpose, the second attaching means may further comprise an external stimulus applying means, such as a heating means, a cooling means, a vacuum applying means and/or an irradiation means.

Figure 7:
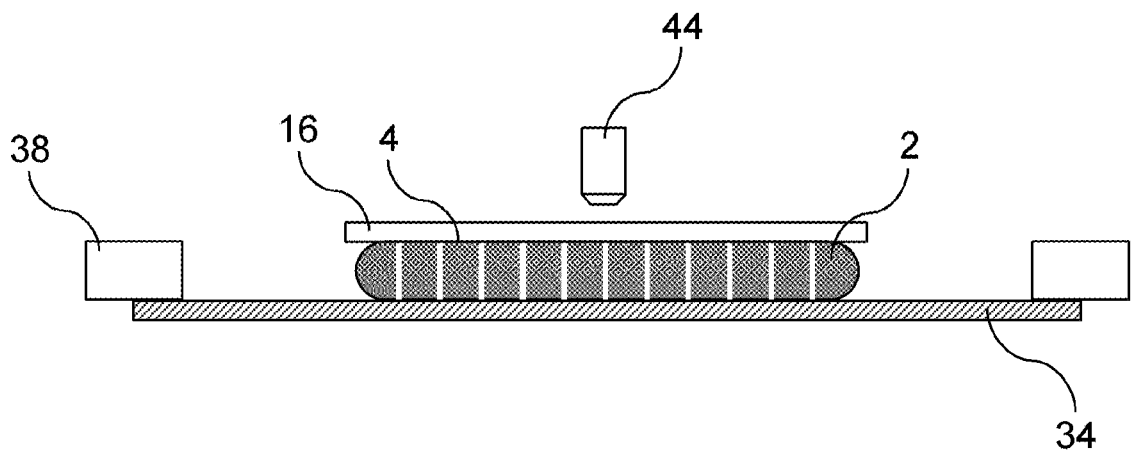
FIG. 7 is a cross-sectional view illustrating a step of inspecting the first side of the wafer for defects through the protective film in the method according to the first embodiment.

In the present embodiment, after attaching the support film 34 to the second side 14 of the divided wafer 2, an optional step of inspecting the first side 4 of the divided wafer 2 for defects through the protective film 16 is performed, as is shown in FIG. 7. Possible defects to be identified when inspecting the first side 4 of the divided wafer 2 through the protective film 16 include, for example, front side chipping, delamination of layers formed on or in the wafer material, cracks, non-straight cut lines (meandering), burrs, whiskers, particles, contaminations, die shifts, i.e., undesired movement of the chips or dies 26, and die size differences, e.g., caused by an undesired slant cut or a cutting width change because of cutting blade wear. This inspection step allows for further defects in the divided wafer 2 originating from the cutting process to be identified.

The first side 4 of the divided wafer 2 is inspected for defects through the protective film 16 by a second inspection means 44 (see FIG. 7), in particular, a camera, such as a microscope camera for optical inspection. The protective film 16 is transparent for visible light. The second inspection means 44 forms part of the substrate processing system according to the present embodiment. In other embodiments of the present invention, the same single inspection means may be used as the first inspection means 30 and the second inspection means 44.

If a defect or defects is or are identified by inspecting the first side 4 of the divided wafer 2 through the protective film 16, a position or positions of the identified defect or defects is or are determined, thereby obtaining third positional information. The substrate processing system according to the present embodiment may comprise a position determining means configured to perform this step. For this purpose, the position determining means configured to obtain the first positional information or a different position determining means may be used. The third positional information is information specifying the position of each defect on the first side 4 of the divided wafer 2. The position of each defect may be defined in a coordinate system of the wafer 2, e.g., in relation to the division lines 6 and/or the devices 8.

The third positional information can be correlated with information on the position of each chip or die 26 in the divided wafer 2, allowing for defective chips or dies 26 to be identified and traced in an even more accurate and efficient manner without having to individually inspect each chip or die 26, as has been detailed above. The control of the substrate processing system according to the present embodiment may be configured to perform this step.

The third positional information can be correlated with the first positional information, as has been detailed above. The control of the substrate processing system according to the present embodiment may be configured to perform this step. In this way, the nature of any defect or defects identified can be determined with a particularly high degree of precision. Also, the efficiency and reliability of identifying and tracing defective chips or dies 26 can be further enhanced.

Figure 8:
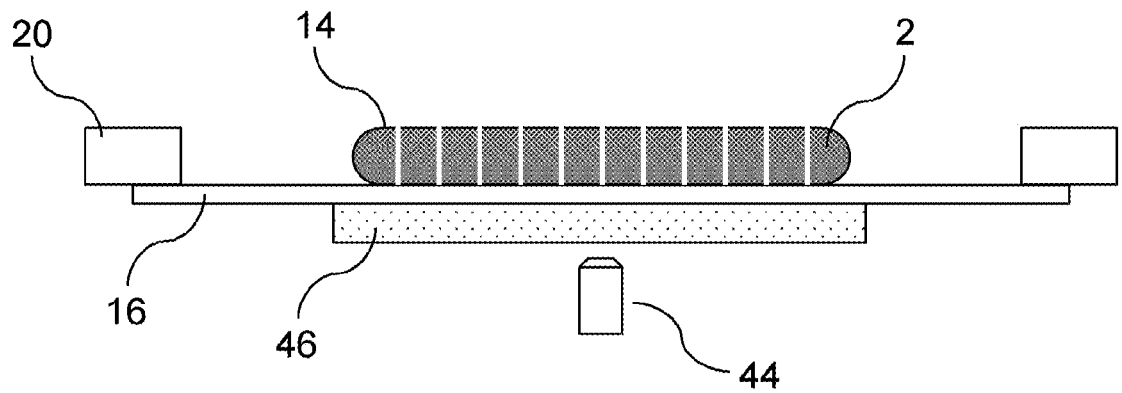
FIG. 8 is a cross-sectional view illustrating a step of inspecting the first side of the wafer for defects through the protective film and through a transparent chuck table in a method according to a modification of the first embodiment.

FIG. 8 illustrates a step of inspecting the first side 4 of the divided wafer 2 for defects through the protective film 16 in a method according to a modification of the first embodiment. The method of this modification differs from the method of the first embodiment in that the step of inspecting the first side 4 of the divided wafer 2 for defects through the protective film 16 is performed before the step of attaching the support film 34 to the second side 14 of the wafer 2, in that the step of cutting the protective film 16 (see FIG. 5) has been omitted and in that the first side 4 of the divided wafer 2 is inspected for defects from below the wafer 2 (rather than from above the wafer 2, as is shown in FIG. 7 for the method of the first embodiment) through a chuck table 46 which is transparent for visible light.

In the modified method illustrated in FIG. 8, the first side 4 of the divided wafer 2 is inspected for defects through the protective film 16 while the wafer 2 is supported by the annular frame 20 via the protective film 16. Further, the divided wafer 2 rests on the chuck table 46. The first side 4 of the divided wafer 2 is inspected for defects by the second inspection means 44 through the protective film 16 and through the transparent chuck table 46. The second inspection means 44 is arranged underneath the transparent chuck table 46, as is illustrated in FIG. 8, so that it can inspect the first side 4 of the divided wafer 2 for defects from below the wafer 2. Third positional information can be obtained in the same manner as detailed above.

Inspecting the first side 4 of the divided wafer 2 for defects by the second inspection means 44 through the protective film 16 and through the transparent chuck table 46 offers the advantage of allowing for the first side 4 to be inspected for defects immediately after dividing the wafer 2 without having to move the wafer 2, in particular, without having to remove the wafer 2 from the chuck table 46. Hence, the inspection process can be performed in a particularly accurate and reliable manner.

If the second side 14 of the divided wafer 2 is inspected for defects from the second side 14 by the first inspection means 30 from above the wafer 2 (see FIG. 4) and the first side 4 of the divided wafer 2 is inspected for defects by the second inspection means 44 through the protective film 16 and through the transparent chuck table 46 from below the wafer 2 (see FIG. 8), these two inspection processes can be performed without having to move the wafer 2, in particular, without having to remove the wafer 2 from the chuck table 46. Hence, the processes of obtaining and correlating positional information can be performed in an especially accurate and reliable manner.

Alternatively, the same single inspection means may be used as the first inspection means 30 and the second inspection means 44, as has been detailed above.

In the modified method, after inspecting the first side 4 of the divided wafer 2 for defects through the protective film 16 and through the transparent chuck table 46, the support film 34 is attached to the second side 14 of the divided wafer 2 substantially in the same manner as detailed above for the method of the first embodiment. Also the subsequent steps, in particular, those of removing the protective film 16 from the first side 4 of the divided wafer 2 and then inspecting the first side 4 of the divided wafer 2 for defects from the first side 4 of the divided wafer 2, are substantially the same as those described below for the method of the first embodiment.

Figure 9:
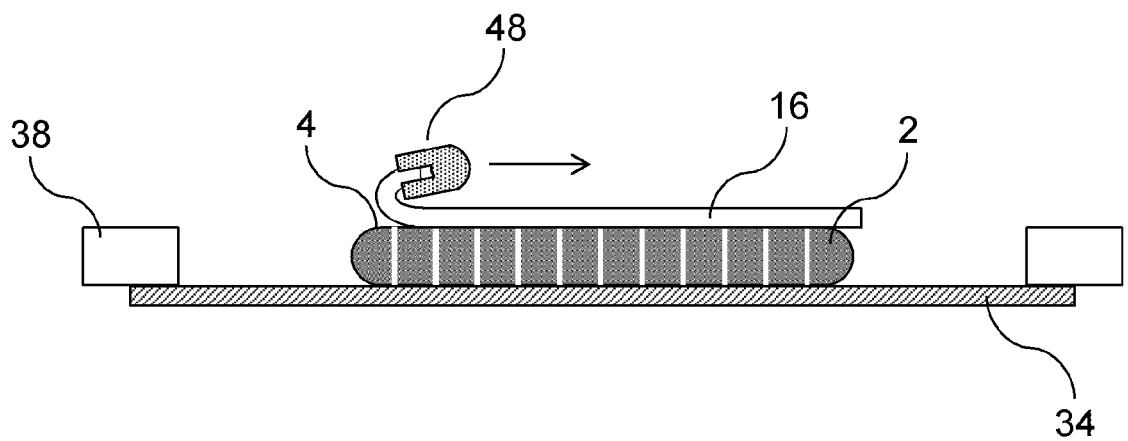
FIG. 9 is a cross-sectional view illustrating a step of removing the protective film from the first side of the wafer in the method according to the first embodiment.

After inspecting the first side 4 of the divided wafer 2 for defects through the protective film 16 in the methods of the first embodiment and the modification of the first embodiment, the protective film 16 is removed, i.e., peeled off, from the first side 4 of the divided wafer 2, as is shown in FIG. 9.

The protective film 16 is removed from the first side 4 of the divided wafer 2 by a protective film removing means 48. The protective film removing means 48 is configured to hold the protective film 16 at a peripheral portion of the protective film 16 and to pull this portion in a direction along the first side 4 of the divided wafer 2, as is indicated by an arrow in FIG. 9, so as to remove the protective film 16 from the first side 4 of the divided wafer 2. The protective film removing means 48 forms part of the substrate processing system according to the present embodiment.

By removing the protective film 16 from the first side 4 of the divided wafer 2, particulates, such as chippings or debris, which have been separated from the wafer 2 during the cutting process, but remained on the wafer 2 due to the presence of the protective film 16, can also be removed. In particular, these particulates may adhere to the protective film 16, e.g., due to the presence of an adhesive on the protective film 16 or due to a material bond between particulates and protective film 16, so that they are removed from the divided wafer 2 together with the protective film 16. Thus, the amount of particulates present on the chips or dies 26 when they are picked up from the support film 34 is greatly reduced. The chips or dies 26 even may be substantially free of such particulates. Therefore, chips or dies 26 with a high quality are obtained and further processing, handling and/or transport of the chips or dies 26 can be rendered considerably more efficient. For example, the chips or dies 26 may be put to use, e.g., assembled into semiconductor package devices or incorporated in electronic equipment, directly after they have been picked up from the support film 34. Moreover, the accuracy and reliability of the inspection of the first side 4 of the divided wafer 2 can be further improved, as will be detailed in the following.

During and after the step of removing the protective film 16 from the first side 4 of the divided wafer 2, the chips or dies 26 are reliably held in their positions by the support film 34.

Figure 10:
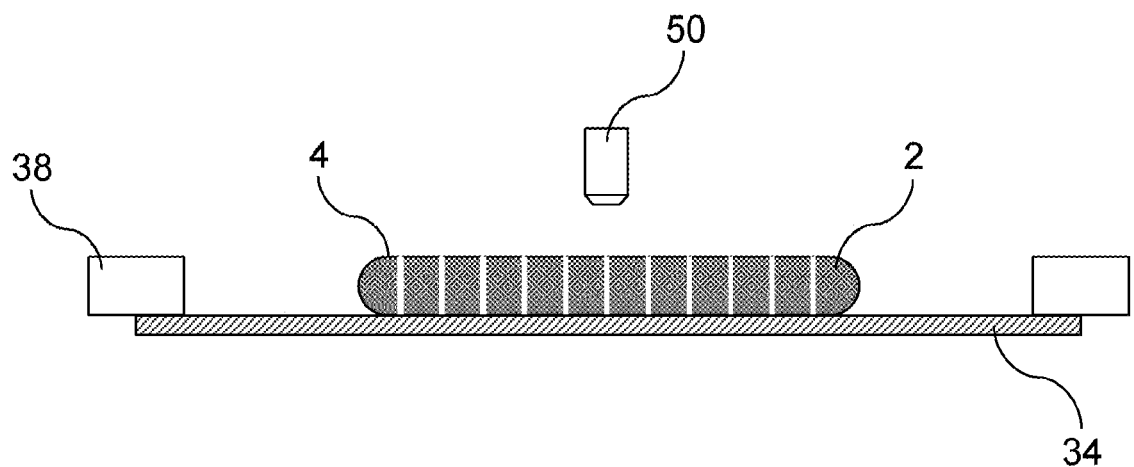
FIG. 10 is a cross-sectional view illustrating a step of inspecting the first side of the wafer for defects from the first side of the wafer in the method according to the first embodiment.

After removing the protective film 16 from the first side 4 of the divided wafer 2, the first side 4 of the divided wafer 2 is inspected for defects from the first side 4 of the divided wafer 2, as is shown in FIG. 10. Possible defects to be identified when inspecting the first side 4 of the divided wafer 2 include, for example, front side chipping, delamination of layers formed on or in the wafer material, cracks, non-straight cut lines (meandering), burrs, whiskers, particles, contaminations, die shifts, i.e., undesired movement of the chips or dies 26, and die size differences, e.g., caused by an undesired slant cut or a cutting width change because of cutting blade wear. This inspection step allows for defects in the divided wafer 2 originating from the cutting process to be identified with an even higher degree of accuracy. In particular, removing the protective film 16 from the first side 4 of the divided wafer 2 causes or enables removal of particulates, such as chippings or debris, which have been separated from the wafer 2 during the cutting process, as has been detailed above. This allows for the detection of defects in the divided wafer 2 which may not have been identifiable prior to removing the protective film 16.

The first side 4 of the divided wafer 2 is inspected for defects by a third inspection means 50 (see FIG. 10), in particular, a camera, such as a microscope camera for optical inspection. The third inspection means 50 forms part of the substrate processing system according to the present embodiment. In other embodiments of the present invention, the same single inspection means may be used as the first inspection means 30, the second inspection means 44 and the third inspection means 50. The same single inspection means may be used as the first inspection means 30 and the third inspection means 50.

If a defect or defects is or are identified by inspecting the first side 4 of the divided wafer 2, a position or positions of the identified defect or defects is or are determined, thereby obtaining second positional information. The substrate processing system according to the present embodiment may comprise a position determining means configured to perform this step. For this purpose, the position determining means configured to obtain the first positional information, the position determining means configured to obtain the third positional information or a different position determining means may be used. The second positional information is information specifying the position of each defect on the first side 4 of the divided wafer 2. The position of each defect may be defined in a coordinate system of the wafer 2, e.g., in relation to the division lines 6 and/or the devices 8.

The second positional information can be correlated with information on the position of each chip or die 26 in the divided wafer 2, allowing for defective chips or dies 26 to be identified and traced in an even more accurate and efficient manner without having to individually inspect each chip or die 26, as has been detailed above. The control of the substrate processing system according to the present embodiment may be configured to perform this step.

The second positional information can be correlated with the first and/or third positional information, as has been detailed above. The control of the substrate processing system according to the present embodiment may be configured to perform this step. In this way, the nature of any defect or defects identified can be determined with an even higher degree of precision. Also, the efficiency and reliability of identifying and tracing defective chips or dies 26 can be further enhanced.

After inspecting the first side 4 of the divided wafer 2 for defects from the first side 4, the chips or dies 26 are picked up from the support film 34. Since defective chips or dies 26 are reliably and accurately identified and traced by the inspection steps, as has been detailed above, such chips or dies 26 can be efficiently separated out and rejected. Those chips or dies 26 for which no defects have been detected may be put to use, e.g., assembled into semiconductor package devices or incorporated in electronic equipment, directly after they have been picked up from the support film 34, as has also been detailed above.

The substrate processing system according to the present embodiment may further comprise a pick-up means configured to pick up the chips or dies 26 from the support film 34 after inspecting the first side 4 of the divided wafer 2 for defects from the first side 4.

In the following, a second embodiment of the present invention will be described with reference to FIG. 11.

The method of the second embodiment differs from the method of the first embodiment in that a stealth laser cutting step is performed before attaching the protective film 16 to the first side 4 of the wafer 2 and in that the wafer 2 may not be cut along its entire thickness in the cutting step (see FIG. 3). The remaining steps of the method of the first embodiment are performed in the same manner in the method of the second embodiment. Hence, a repeated detailed description thereof is omitted.

Figure 11:
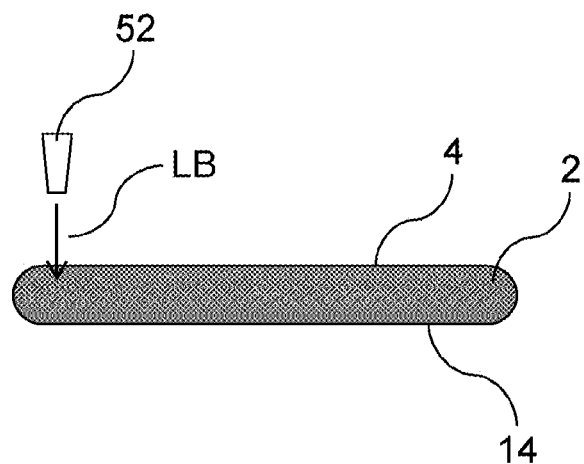
FIG. 11 is a cross-sectional view illustrating a step of performing a stealth laser cutting process on the wafer from the first side of the wafer in a method according to a second embodiment of the present invention.

In particular, in the method of the second embodiment, a stealth laser cutting step is performed from the first side 4 of the wafer 2 along the division lines 6 before attaching the protective film 16 to the first side 4, as is shown in FIG. 11. In this step, a laser beam LB having a wavelength that allows transmission of the laser beam LB through the wafer 2 is applied to the wafer 2. The laser beam LB is applied to the wafer 2 in a plurality of positions along the division lines 6 so as to form a plurality of modified regions in the wafer 2 along the division lines 6. By forming these modified regions, the strength of the wafer 2 in the areas thereof where the modified regions are formed is reduced. Hence, the division of the wafer 2 along the division lines 6 in the subsequent cutting step or in a later separation step is greatly facilitated.

The laser beam LB may be a pulsed laser beam. The pulsed laser beam may have a pulse width, for example, in the range of 1 fs to 1000 ns.

The laser beam LB is applied to the wafer 2 by a stealth laser cutting means 52 (see FIG. 11). The stealth laser cutting means 52 forms part of the substrate processing system according to the present embodiment.

In the step of cutting the wafer 2 from the second side 14 thereof, the wafer 2 may only be cut along part, e.g., half, of its thickness. For this cutting step, a cutting means 28 (see FIG. 3) in the form of a cutting blade configured to mechanically cut the wafer 2 is used. A mechanical cutting load exerted on the wafer 2 by the cutting means 28 can help cracks in the wafer 2 generated in the stealth laser cutting step to propagate to the first side 4 of the wafer 2, thus fully dividing the wafer 2 into the separate chips or dies 26.

Alternatively, in the cutting step, the wafer 2 may be cut along its entire thickness, e.g., by mechanical cutting and/or laser cutting and/or plasma cutting. In this case, the presence of the modified regions along the division lines 6 facilitates the cutting process due to the local reduction of the strength of the wafer 2.

In the step of inspecting the first side 4 of the wafer 2 for defects through the protective film 16 (see FIGS. 7 and 8) and/or in the step of inspecting the first side 4 of the wafer 2 for defects from the first side 4 of the wafer 2 after removal of the protective film 16 (see FIG. 10), it can be identified whether cracks in the wafer 2 generated in the stealth laser cutting step have propagated to the first side 4 of the wafer 2.

If it is identified in one or both of these inspection steps that such cracks have not propagated to the first side 4 of the wafer 2 or that the wafer 2 has not been fully divided into the separate chips or dies 26 by crack propagation, a separation step may be performed subsequent to inspecting the first side 4 of the wafer 2 for defects from the first side 4 of the wafer 2 after removal of the protective film 16. In this separation step, an external force may be applied to the wafer 2, in particular, by expanding, e.g., radially expanding, the support film 34, i.e., by using the support film 34 as an expansion tape. In this way, the wafer 2 can be fully divided into the separate chips or dies 26 along the division lines 6. Such a step of expanding, in particular, radially expanding, the support film 34 will be explained in further detail below with reference to FIG. 17 for the method of the fourth embodiment of the present invention.

If it is identified in the step of inspecting the first side 4 of the wafer 2 for defects through the protective film 16 that cracks have not propagated to the first side 4 of the wafer 2 or that the wafer 2 has not been fully divided into the separate chips or dies 26 by crack propagation, the separation step may be performed prior to inspecting the first side 4 of the wafer 2 for defects from the first side 4 of the wafer 2 after removal of the protective film 16. In this case, any defects in the wafer 2 which may have been caused by the separation step can be reliably identified in this latter inspection step.

Optionally, before expanding the support film 34, a breaking step can be performed on the wafer 2 in order to break the wafer 2 along the division lines 6.

Also if the wafer 2 is fully divided into the chips or dies 26 in the cutting process (see FIG. 3), a step of expanding, e.g., radially expanding, the support film 34 may be carried out before or after inspecting the first side 4 of the wafer 2 for defects from the first side 4. In this way, the separated chips or dies 26 can be moved away from each other, thus increasing the distance between adjacent chips or dies 26. Increasing the die-to-die distance in this manner particularly reliably ensures that the chips or dies 26 are not damaged in the step of picking them up from the support film 34.

Figure 12:
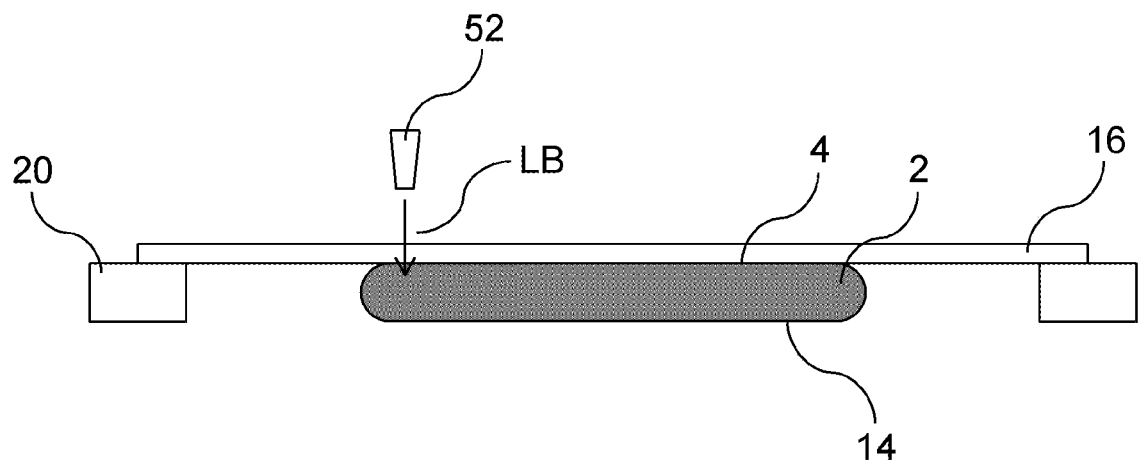
FIG. 12 is a cross-sectional view illustrating a step of performing a stealth laser cutting process on the wafer through the protective film from the first side of the wafer in a method according to a third embodiment of the present invention.
Figure 13:
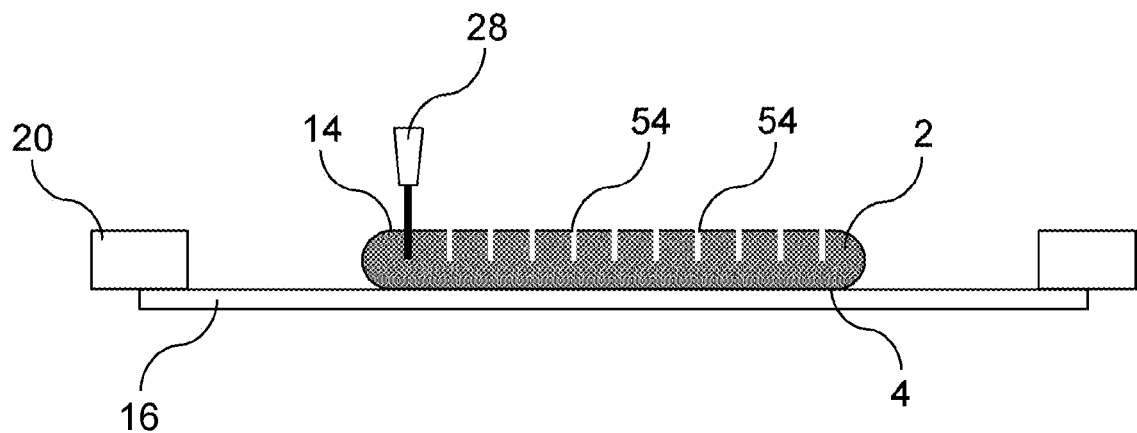
FIG. 13 is a cross-sectional view illustrating a step of performing a blade cutting process on the wafer from the second side of the wafer in a method according to a fourth embodiment of the present invention.

In the following, a third embodiment of the present invention will be described with reference to FIG. 12.

The method of the third embodiment differs from the method of the second embodiment only in the order of the steps of attaching the protective film 16 to the first side 4 of the wafer 2 and performing the stealth laser cutting step on the wafer 2. The remaining steps of the method of the second embodiment are performed in the same manner in the method of the third embodiment. Hence, a repeated detailed description thereof is omitted.

In particular, in the method of the third embodiment, the protective film 16 is attached to the first side 4 of the wafer 2 first (see FIG. 2). After this attachment step, but before cutting the wafer 2 from its second side 14 (see FIG. 3), a stealth laser cutting step is performed from the first side 4 of the wafer 2 along the division lines 6 substantially in the same manner as in the method of the second embodiment. The only difference is that the laser beam LB is applied to the wafer 2 through the protective film 16, as is shown in FIG. 12. Thus, the wavelength of the laser beam LB is chosen so that the laser beam LB is transmitted through the protective film 16, i.e., so that the protective film 16 is transparent for the laser beam LB.

In the following, a fourth embodiment of the present invention will be described with reference to FIGS. 13 to 17.

The method of the fourth embodiment differs from the method of the first embodiment in that, in the cutting step (see FIG. 3), the wafer 2 is only cut from the second side 14 along part of its thickness and in that a stealth laser cutting step is performed on the wafer 2 after attaching the support film 34 to the second side 14 of the wafer 2. The remaining steps of the method of the first embodiment are performed in the same manner in the method of the fourth embodiment. Hence, a repeated detailed description thereof is omitted.

In particular, in the method of the fourth embodiment, the protective film 16 is attached to the first side 4 of the wafer 2 as described above for the method of the first embodiment (see FIG. 2). Subsequently, the wafer 2 is cut along the division lines 6 from the second side 14 of the wafer 2 by the cutting means 28. In this step, the wafer 2 is cut only along part of its thickness so that the wafer 2 is not fully divided in the cutting process. Rather, cutting groves 54 are provided which extend from the second side 14 towards the first side 4 of the wafer 2 but do not reach the first side 4.

Alternatively, the wafer 2 may be cut along the division lines 6 along part of its thickness by laser cutting and/or plasma cutting, as has been detailed above. Also, a sequence of mechanical cutting and/or laser cutting and/or plasma cutting steps may be applied.

Figure 14:
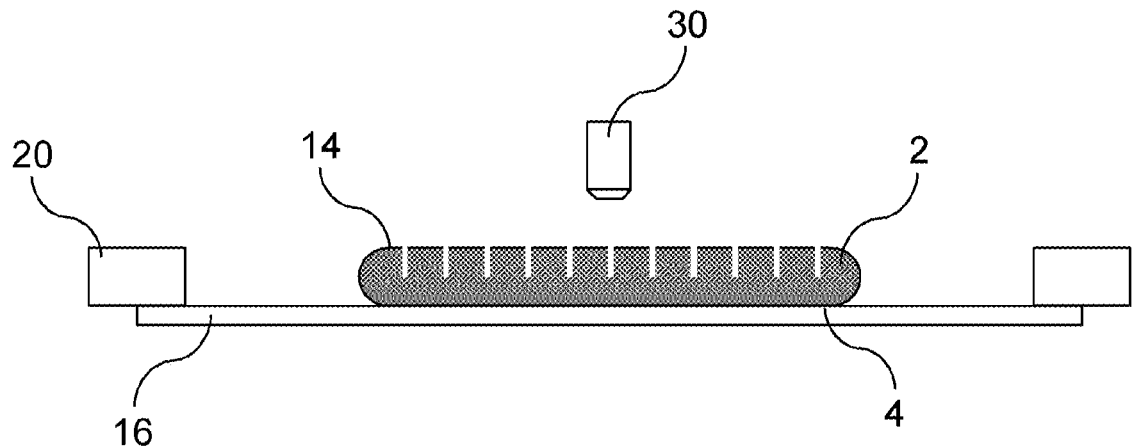
FIG. 14 is a cross-sectional view illustrating a step of inspecting the second side of the wafer for defects from the second side of the wafer in the method according to the fourth embodiment.

After cutting the wafer 2 along the division lines 6 along part of its thickness, the second side 14 of the partially cut wafer 2 is inspected for defects from the second side 14 of the wafer 2 by the first inspection means 30, as is shown in FIG. 14. This inspection step and the subsequent steps of obtaining first positional information and correlating this information with information on the position of each chip or die 26 to be obtained from the wafer 2 in the wafer 2 are performed in the same manner as described above for the method of the first embodiment.

Figure 15:
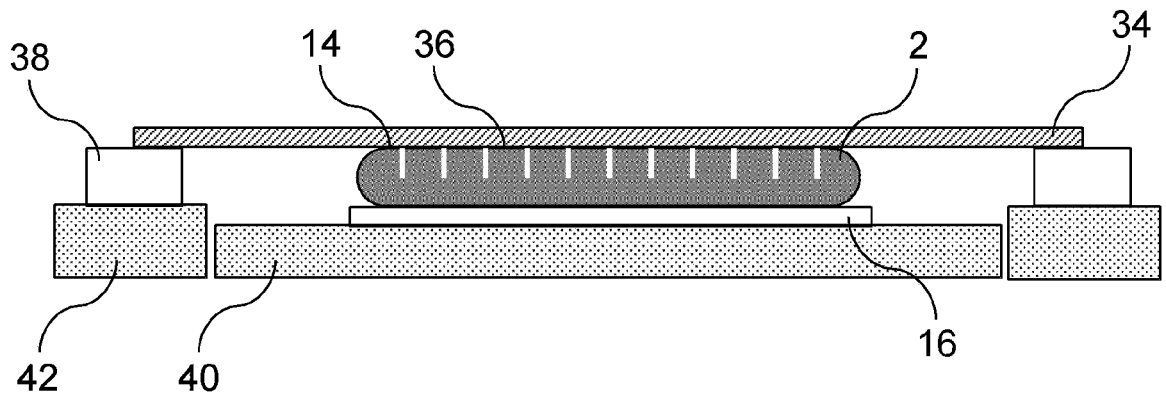
FIG. 15 is a cross-sectional view illustrating a step of attaching the support film to the second side of the wafer in the method according to the fourth embodiment.

After inspecting the second side 14 of the partially cut wafer 2 for defects from the second side 14 of the wafer 2, the optional step of cutting the protective film 16 in a circular manner along the outer circumference of the wafer 2 is carried out in the same manner as for the first embodiment (see FIG. 5). Subsequently, the support film 34 is attached to the second side 14 of the partially cut wafer 2 by the second attaching means comprising the chuck table 40 and the annular frame holder 42, as is shown in FIG. 15. Also this latter step is performed in the same manner as described above for the method of the first embodiment (see also FIG. 6).

Figure 16:
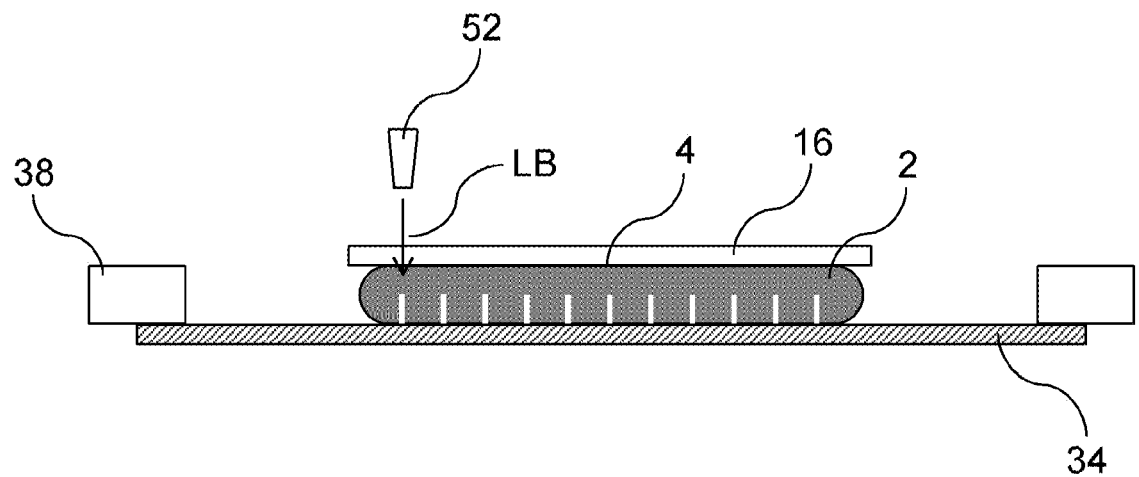
FIG. 16 is a cross-sectional view illustrating a step of performing a stealth laser cutting process on the wafer through the protective film from the first side of the wafer in the method according to the fourth embodiment.

After attaching the support film 34 to the second side 14 of the partially cut wafer 2, a stealth laser cutting step is performed from the first side 4 of the wafer 2 along the division lines 6 through the protective film 16, as is shown in FIG. 16. In this step, which is performed substantially in the same manner as described above for the method of the third embodiment (see also FIG. 12), the laser beam LB, having a wavelength that allows transmission of the laser beam LB through the protective film 16 and through the wafer 2, is applied to the wafer 2 by the stealth laser cutting means 52. The laser beam LB is applied to the wafer 2 in a plurality of positions along the division lines 6 where the cutting groves 54 are formed (see FIG. 13), so as to form a plurality of modified regions in the wafer 2 along the division lines 6. The modified regions are formed in the remaining portions of the wafer 2 along the division lines 6 which have not been cut in the cutting step, i.e., the modified regions are formed above the cutting grooves 54 in the direction from the second side 14 towards the first side 4 of the wafer 2.

By forming these modified regions, the strength of the remaining portions of the wafer 2 is reduced. Cracks in the wafer 2 generated in the stealth laser cutting step may propagate to the first side 4 of the wafer 2 and to bottoms of the cutting grooves 54, thus fully dividing the wafer 2 into the separate chips or dies 26 (see FIG. 17). Alternatively, the wafer 2 may not be fully divided in the stealth laser cutting process.

After performing the stealth laser cutting step from the first side 4 of the wafer 2 along the division lines 6 through the protective film 16, the protective film 16 is removed, i.e., peeled off, from the first side 4 of the wafer 2 in the same manner as described above for the method of the first embodiment (see FIG. 9).

After removing the protective film 16 from the first side 4 of the wafer 2, the first side 4 of the wafer 2 is inspected for defects from the first side 4 of the wafer 2 in the same manner as described above for the method of the first embodiment (see FIG. 10). Also the subsequent steps of obtaining second positional information and correlating this information with the first positional information and with information on the position of each chip or die 26 to be obtained from the wafer 2 in the wafer 2 are performed in the same manner as described above for the method of the first embodiment.

Figure 17:
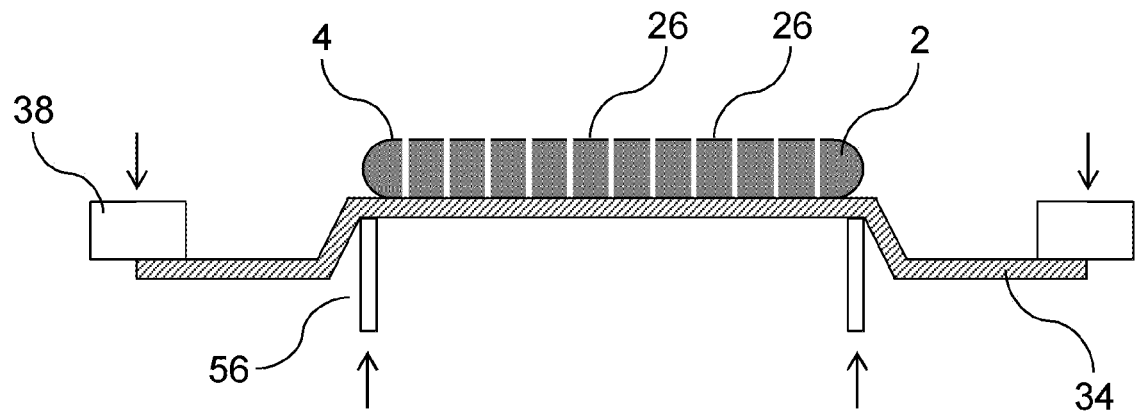
FIG. 17 is a cross-sectional view illustrating a step of applying an external force to the wafer by radially expanding the support film in the method according to the fourth embodiment.

After removing the protective film 16 from the first side 4 of the wafer 2, a separation step is carried out, as is shown in FIG. 17. The separation step may be performed before or after inspecting the first side 4 of the wafer 2 for defects from the first side 4 of the wafer 2. In this separation step, the support film 34 is radially expanded, i.e., used as an expansion tape. If the wafer 2 has not been fully divided in the stealth laser cutting step, the radial expansion of the support film 34 applies an external force to wafer 2, fully dividing the wafer 2 into the separate chips or dies 26 along the division lines 6 (see FIG. 17). If the wafer 2 has been fully divided in the stealth laser cutting step, the radial expansion of the support film 34 moves the separated chips or dies 26 away from each other, thus increasing the distance between adjacent chips or dies 26. Increasing the die-to-die distance in this manner particularly reliably ensures that the chips or dies 26 are not damaged in the subsequent step of picking them up from the support film 34.

If the separation step is performed after inspecting the first side 4 of the wafer 2 for defects from the first side 4 of the wafer 2, it can be identified in this inspection step whether cracks in the wafer 2 generated in the stealth laser cutting step have propagated to the first side 4 of the wafer 2, as has been detailed above for the method of the second embodiment.

If the separation step is performed before inspecting the first side 4 of the wafer 2 for defects from the first side 4 of the wafer 2, any defects in the wafer 2 which may have been caused by the separation step can be reliably identified in this inspection step.

The support film 34 is radially expanded by an expansion means comprising an expansion drum 56 (see FIG. 17). In the expansion process, an upper edge of the expansion drum 56 is brought into contact with a portion of the support film 34 arranged along the outer circumference of the wafer 2 from below the support film 34. Subsequently, the expansion drum 56 and the annular frame 38, having the support film 34 attached thereto, are moved relative to each other in the vertical direction, i.e., in the direction from the second side 14 towards the first side 4 of the wafer 2. In particular, the expansion drum 56 is moved upwards and/or the annular frame 38 is moved downwards, as is indicated by arrows in FIG. 17. In this way, the support film 34 is radially expanded. The expansion means forms part of the substrate processing system according to the present embodiment.

In other embodiments of the method and the system of the present invention, the support film 34 may be expanded using a different expansion means, e.g., employing expanding bars. For example, the expanding apparatus described in DE 10 2018 207 498 A1 may be used as an expansion means for expanding the support film 34.

Optionally, before expanding, e.g., radially expanding, the support film 34, a breaking step can be performed on the wafer 2 in order to break the wafer 2 along the division lines 6.

After expanding the support film 34, the chips or dies 26 are picked up from the support film 34 as described above for the method of the first embodiment.

The method of the fourth embodiment may be modified by changing the order of the steps of performing the stealth laser cutting step from the first side 4 of the wafer 2 along the division lines 6 and removing the protective film 16 from the first side 4 of the wafer 2. Specifically, in the modified method, the protective film 16 is removed from the first side 4 of the wafer 2 before carrying out the stealth laser cutting step from the first side 4 of the wafer 2. Hence, the laser beam LB is applied directly to the wafer 2, i.e., without having to pass through the protective film 16, in the same manner as described above for the method of the second embodiment (see FIG. 11). The remaining steps of the modified method are the same as those of the method according to the fourth embodiment.

The methods and systems according to the first to fourth embodiments described above may be modified by using a protective film 16 and/or a support film 34 having a cushioning layer or a cushioning layer and a base sheet attached thereto, as has been detailed above.

In the methods and systems according to the first to fourth embodiments described above, processing is performed on the back side of the substrate, i.e., the wafer 2. However, in other embodiments of the present invention, the substrate may be processed from the front side of the substrate.

The invention claimed is:

1. A method of processing a substrate, the substrate having a first side and a second side being opposite to the first side, wherein the method comprises:
    attaching a protective film to the first side of the substrate;
    after attaching the protective film to the first side of the substrate, processing the substrate from the second side of the substrate;
    after processing the substrate from the second side of the substrate, inspecting the second side of the substrate for defects from the second side of the substrate;
    after inspecting the second side of the substrate for defects, attaching a support film to the second side of the substrate;
    removing the protective film from the first side of the substrate; and
    after removing the protective film from the first side of the substrate, inspecting the first side of the substrate for defects from the first side of the substrate.

2. The method according to claim 1, further comprising inspecting the first side of the substrate for defects through the protective film before removing the protective film from the first side of the substrate.

3. The method according to claim 2, wherein inspecting the first side of the substrate for defects through the protective film is performed before or after attaching the support film to the second side of the substrate.

4. The method according to claim 3, wherein the substrate has on the first side a device area with a plurality of devices.

5. The method according to claim 4, further comprising:
    determining a position or positions of a defect or defects identified by inspecting the second side of the substrate, thereby obtaining first positional information, and
    determining a position or positions of a defect or defects identified by inspecting the first side of the substrate, thereby obtaining second positional information.

6. The method according to claim 4, further comprising:
    determining a position or positions of a defect or defects identified by inspecting the second side of the substrate, thereby obtaining first positional information, or
    determining a position or positions of a defect or defects identified by inspecting the first side of the substrate, thereby obtaining second positional information.

7. The method according to claim 5, further comprising correlating the first positional information with the second positional information.

8. The method according to claim 7, wherein
    inspecting the second side of the substrate for defects from the second side of the substrate is performed using an inspection means, and
    the inspection means is also used for inspecting the first side of the substrate for defects from the first side of the substrate.

9. The method according to claim 8, wherein the support film is attached to the second side of the substrate so that at least a central area of a front surface of the support film is in direct contact with the second side of the substrate, such that no adhesive is present between at least the central area of the front surface of the support film and the second side of the substrate.

10. The method according to claim 9, wherein the substrate is a wafer.

11. The method according to claim 10, wherein the protective film is attached to the first side of the substrate so that at least a central area of a front surface of the protective film is in direct contact with the first side of the substrate, such that no adhesive is present between at least the central area of the front surface of the protective film and the first side of the substrate.

12. The method according to claim 11, wherein processing the substrate from the second side of the substrate comprises dividing the substrate into a plurality of separate elements from the second side of the substrate.

13. The method according to claim 12, wherein dividing the substrate into the plurality of separate elements comprises cutting the substrate along a thickness direction of the substrate, the thickness direction extending from the second side of the substrate towards the first side of the substrate.

14. The method according to claim 13, wherein cutting the substrate along the thickness direction of the substrate comprises at least one of mechanically cutting the substrate, laser cutting the substrate and plasma cutting the substrate.

15. The method according to claim 12, further comprising, after inspecting the first side of the substrate for defects from the first side of the substrate, picking up the separate elements from the support film.

16. The method according to claim 15, wherein processing the substrate from the second side of the substrate comprises thinning the substrate so as to reduce the thickness of the substrate.

17. The method according to claim 10, wherein the substrate is a semiconductor wafer.

18. A system for processing a substrate, the substrate having a first side and a second side being opposite to the first side, wherein the system comprises:
   an attaching means configured to attach a protective film to the first side of the substrate;
   a processing means configured to process the substrate from the second side of substrate, after attaching the protective film to the first side of the substrate;
   an inspection means configured to inspect the second side of the substrate for defects from the second side of the substrate, after processing the substrate from the second side of the substrate;
   an attaching means configured to attach a support film to the second side of the substrate, after inspecting the second side of the substrate for defects;
   a protective film removing means configured to remove the protective film from the first side of the substrate; and
   an inspection means configured to inspect the first side of the substrate for defects from the first side of the substrate, after removing the protective film from the first side of the substrate.

19. The system according to claim 18, wherein the inspection means configured to inspect the second side of the substrate and the inspection means configured to inspect the first side of the substrate are the same single inspection means.

20. The system according to claim 18, wherein the attaching means configured to attach the protective film to the first side of the substrate and the attaching means configured to attach the support film to the second side of the substrate are the same single attaching means.

* * * * *